(12) United States Patent
Vise et al.

(10) Patent No.: US 12,705,620 B2
(45) Date of Patent: Aug. 11, 2026

(54) DISPLAY FIXTURE CONFIGURATION AND MANAGEMENT SYSTEM

(71) Applicant: UNEFI INC., Toronto (CA)

(72) Inventors: Samuel Arthur Vise, Toronto (CA); Ranko Dimić, Toronto (CA)

(73) Assignee: UNEFI INC., Toronto (CA)

( * ) Notice: Subject to any disclaimer, the term of this patent is extended or adjusted under 35 U.S.C. 154(b) by 408 days.

(21) Appl. No.: 18/075,533

(22) Filed: Dec. 6, 2022

(65) Prior Publication Data

US 2023/0169507 A1 Jun. 1, 2023

Related U.S. Application Data

(63) Continuation-in-part of application No. 15/369,305, filed on Dec. 5, 2016, now abandoned.

(60) Provisional application No. 62/279,982, filed on Jan. 18, 2016.

(51) Int. Cl.

| | |
|---|---|
| ***G06Q 30/02*** | (2023.01) |
| ***G06Q 10/0875*** | (2023.01) |
| ***G06Q 10/20*** | (2023.01) |
| ***G06Q 20/40*** | (2012.01) |
| ***G06Q 30/0601*** | (2023.01) |

(52) U.S. Cl.

CPC ..... *G06Q 20/4014* (2013.01); *G06Q 10/0875* (2013.01); *G06Q 10/20* (2013.01); *G06Q 30/0637* (2013.01); *G06Q 30/0643* (2013.01)

(58) Field of Classification Search

CPC ........... G06Q 20/4014; G06Q 10/0875; G06Q 10/20; G06Q 30/0637; G06Q 30/0643; G06Q 30/0201

See application file for complete search history.

(56) References Cited

U.S. PATENT DOCUMENTS

2003/0222762 A1* 12/2003 Beigl ..................... G06K 17/00 705/22
2004/0117383 A1* 6/2004 Lee ....................... G06Q 10/02
2008/0103851 A1 5/2008 Walker et al.
(Continued)

OTHER PUBLICATIONS

Uline, "Gondola Shelving," https:/Aveb.archive.org/web/20150214004142/http:/Awww.uline.com/BL_246/Gondola-Shelving, available Jan. 12, 2015 (Year: 2015).

*Primary Examiner* — Breffni Baggot

(74) *Attorney, Agent, or Firm* — ICE MILLER LLP; Justin D. Swindells

(57) ABSTRACT

Systems and methods for managing a store's displays and for automatically ordering components for such displays. A system includes at least one database of products details regarding each product's various prices, physical packaging dimensions, descriptions, and at least one image of each product. The system allows a user to configure a fixture on which products are to be displayed. Each display fixture can then be provisioned by the user so that the identity of the products to be displayed on each display peg or shelf is displayed. The database may also include a database of the various display fixtures used in the store along with the parts, components, and supplies for those fixtures. The system automatically generates purchase orders and authorization requests if an order is above a certain amount. In the event a request is not addressed within a certain amount of time, the system generates automated reminders.

12 Claims, 26 Drawing Sheets

(56) References Cited

U.S. PATENT DOCUMENTS

| | | | | |
|---|---|---|---|---|
| 2009/0043676 | A1 | 2/2009 | Riley et al. | |
| 2011/0288938 | A1 | 11/2011 | Cook et al. | |
| 2014/0336791 | A1* | 11/2014 | Asenjo | G05B 13/026<br>700/44 |
| 2015/0120388 | A1 | 4/2015 | Tan et al. | |
| 2016/0335586 | A1* | 11/2016 | Panchamgam | G06Q 10/087 |

* cited by examiner

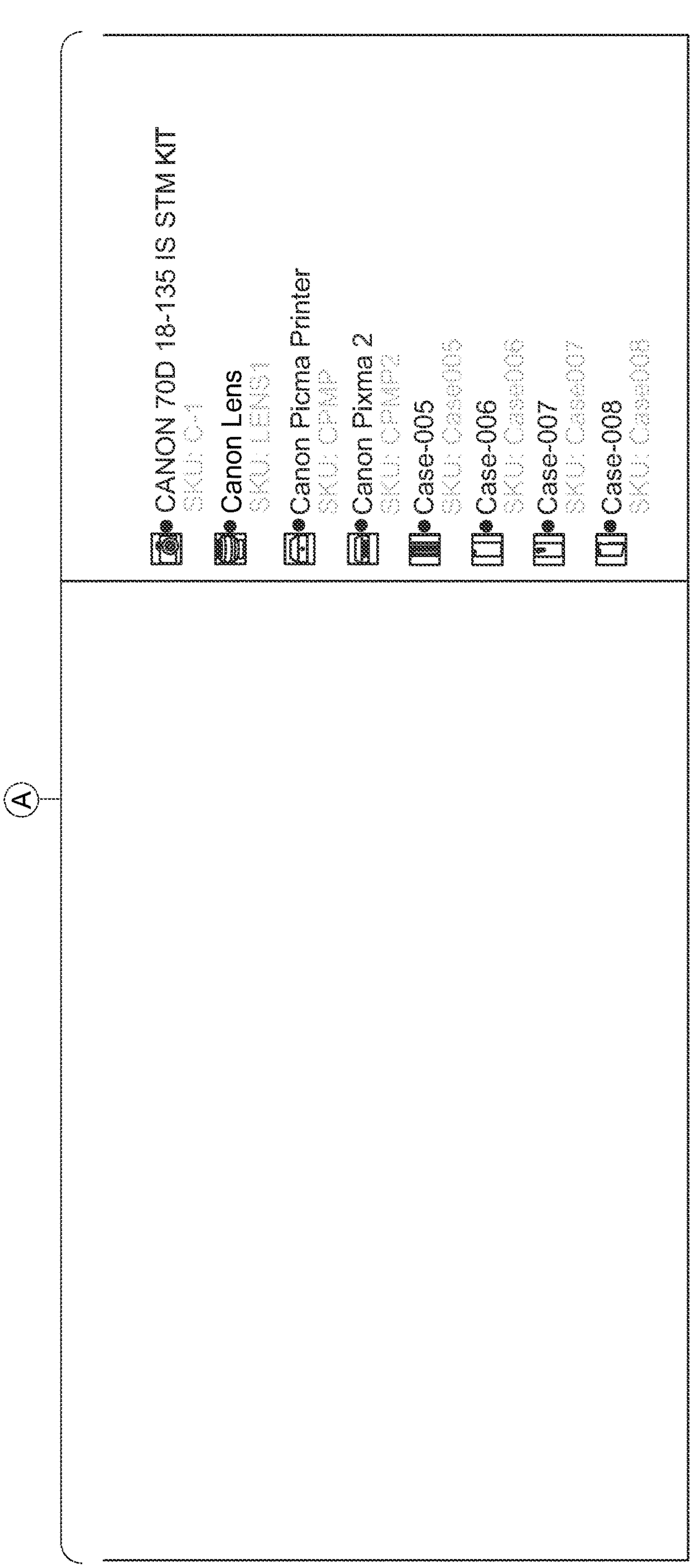
FIG. 3 (Continued...)

A

- ☐ kate spade new york Confetti iPhone 5/5s Fitted Hard Shell Case - Cream/Gold
  SKU: TA4593810
- ☐ kate spade new york Confetti iPhone 6/6s Fitted Hard Shell Case - Cream/Gold - Only at Best Buy
  SKU: TA4593764
- ☐ kate spade new york Diagonal Stripe 4000mAh Portable Charger (KSPW-207-DSCG-INT) - Cream/Gold
  SKU: TA4593702
- ☐ kate spade new york Fairmont 4000mAh Portable Charger (KSPW-207-FRP-INT) - Red/Pink
  SKU: TA4593743
- ☐ kate spade new york Hearts iPhone 6/6s Fitted Hard Shell Case -

FIG. 4 (Continued...)

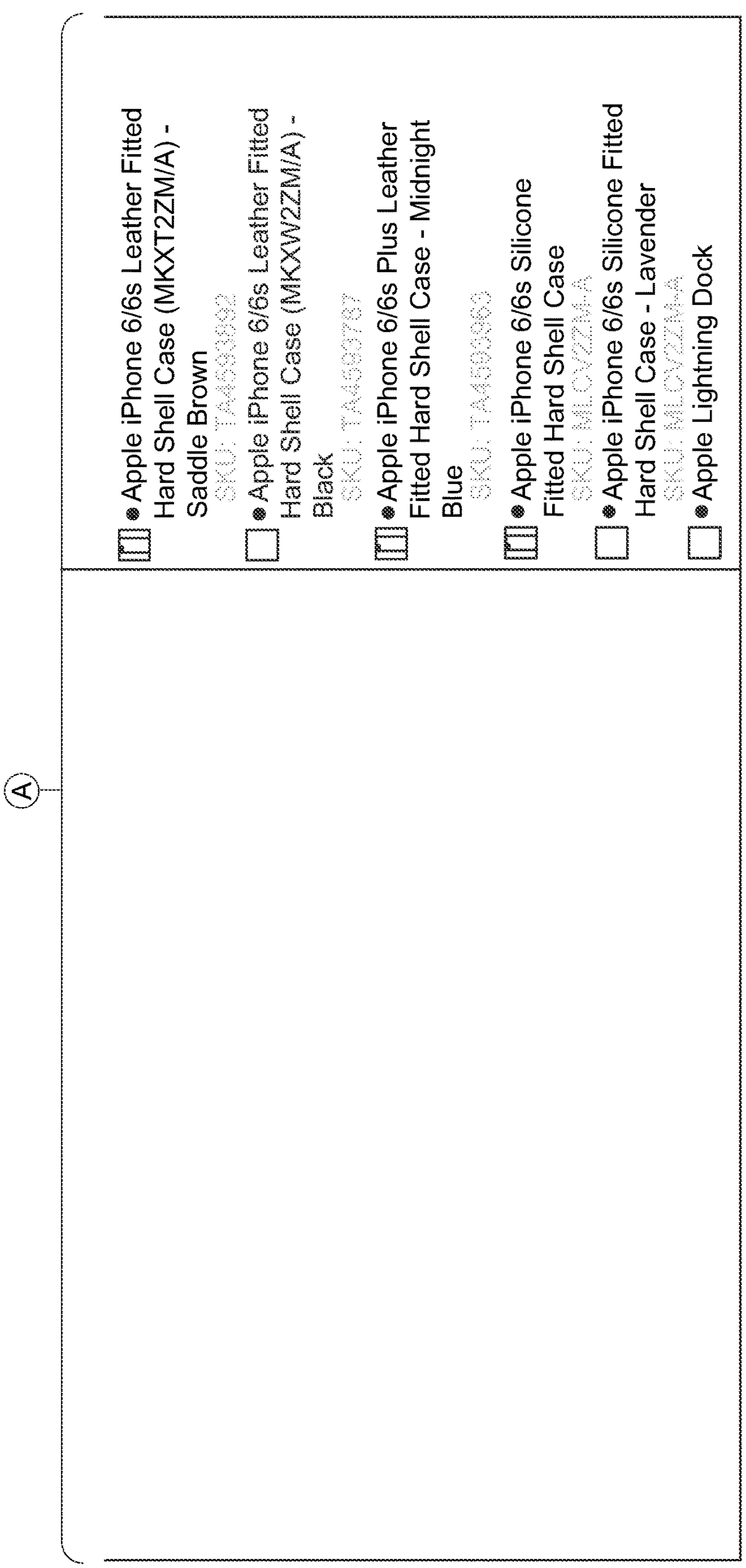
FIG. 5 (Continued...)

Collateral | Printing Specs | Workgroups | Channels | Supplies | Parts | Locations | Hardware | 360 | Colors | Store Links | Translator | Import

New Supply Configure

| | Item Name | Description |
|---|---|---|
| 1 | Ink Cartridge | Lorem Ipsum is simply dummy text of the printing and typeset |
| 2 | Computer Mouse | Wirde mouse for POS station |
| 3 | Carbage Bags | Lorem Ipsum is simply dummy text of the printing and typeset |
| 4 | Print Paper | Please use only 100% recycled paper |

FIG. 6A

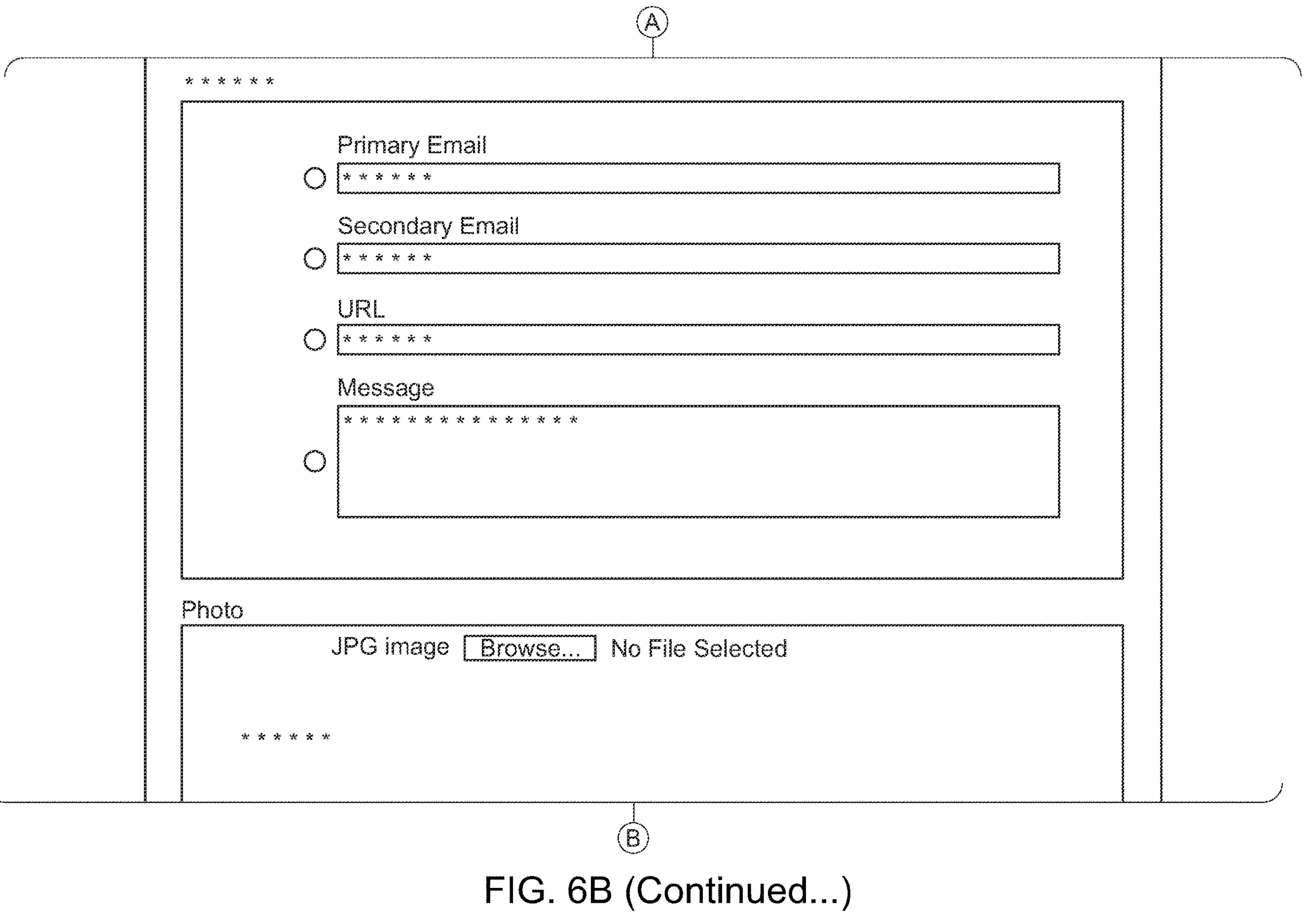
FIG. 6B (Continued...)

FIG. 6B (Continued...)

Supplies for *Rogers-Telus Premium Side Counter (10x15 kiosk)

| | Item Name | Description/Action | Area | QTY |
|---|---|---|---|---|
| ☐ | Acrylic Price Card Holder | | Counter | Number |
| | FIFO Stickers | http://www.eway.ca | OSA1 Drawer | |
| | Drop Safe - 9V Battery | If your drop safe has a low battery, please Purchase a 9V at your local store and expense back // si les batteries de votr | D4 Door | |
| ☐ | Hanging File Folders | | D3 Drawer | Number |
| ☐ | File Folders | | D3 Drawer | Number |
| | HYLA Supplies | To be ordered through wowsupport@hylamobile.com | D2 Drawer | |
| ☐ | RBC Deposit Slips | | D1 Drawer | Number |
| ☐ | RBC Daily Deposit Bags | | D1 Drawer | Number |
| | Garda Weekly Deposit Bags | Order through your Garda Driver when your on hand reaches 10 or less | D1 Drawer | |

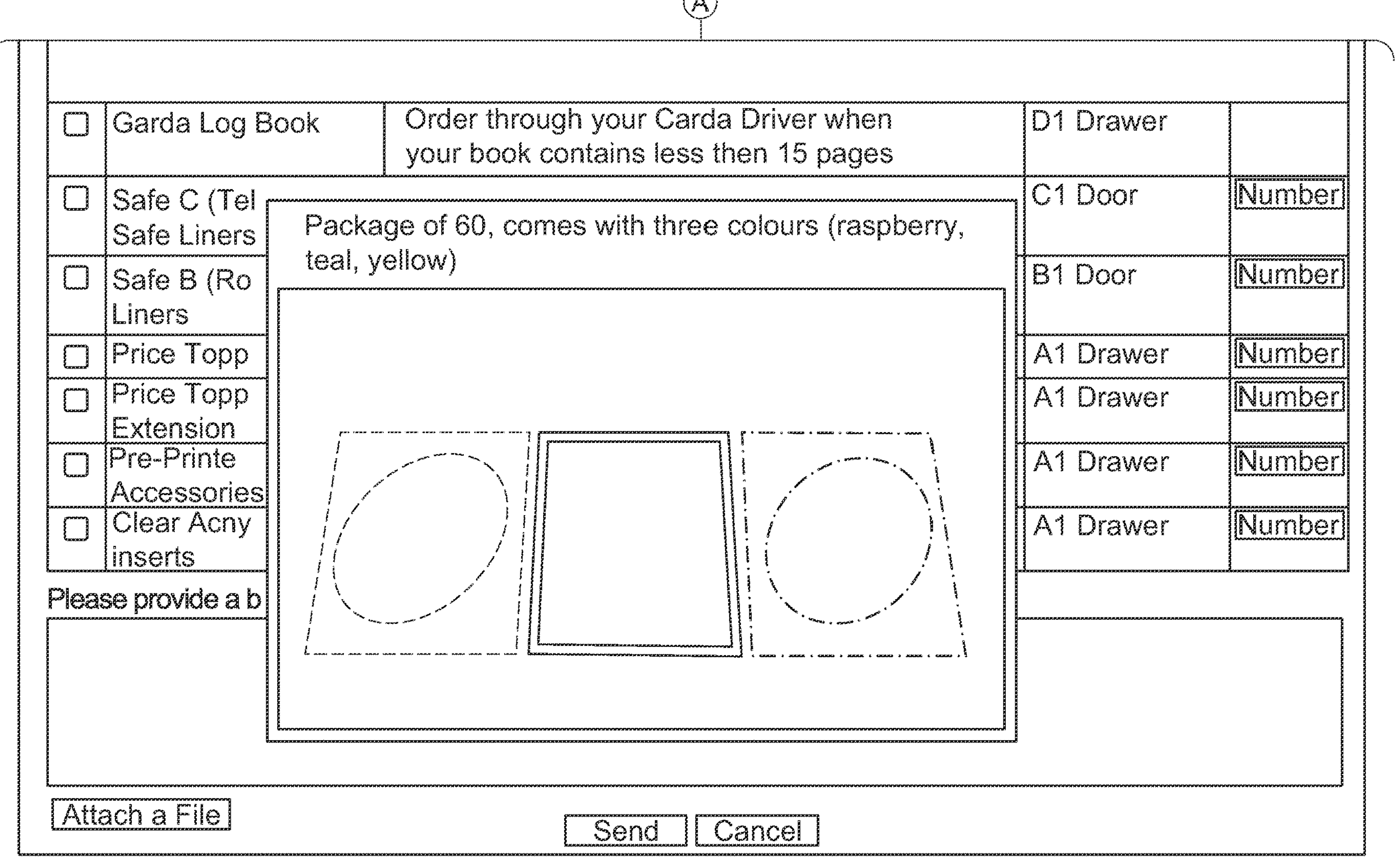
FIG. 7 (Continued...)

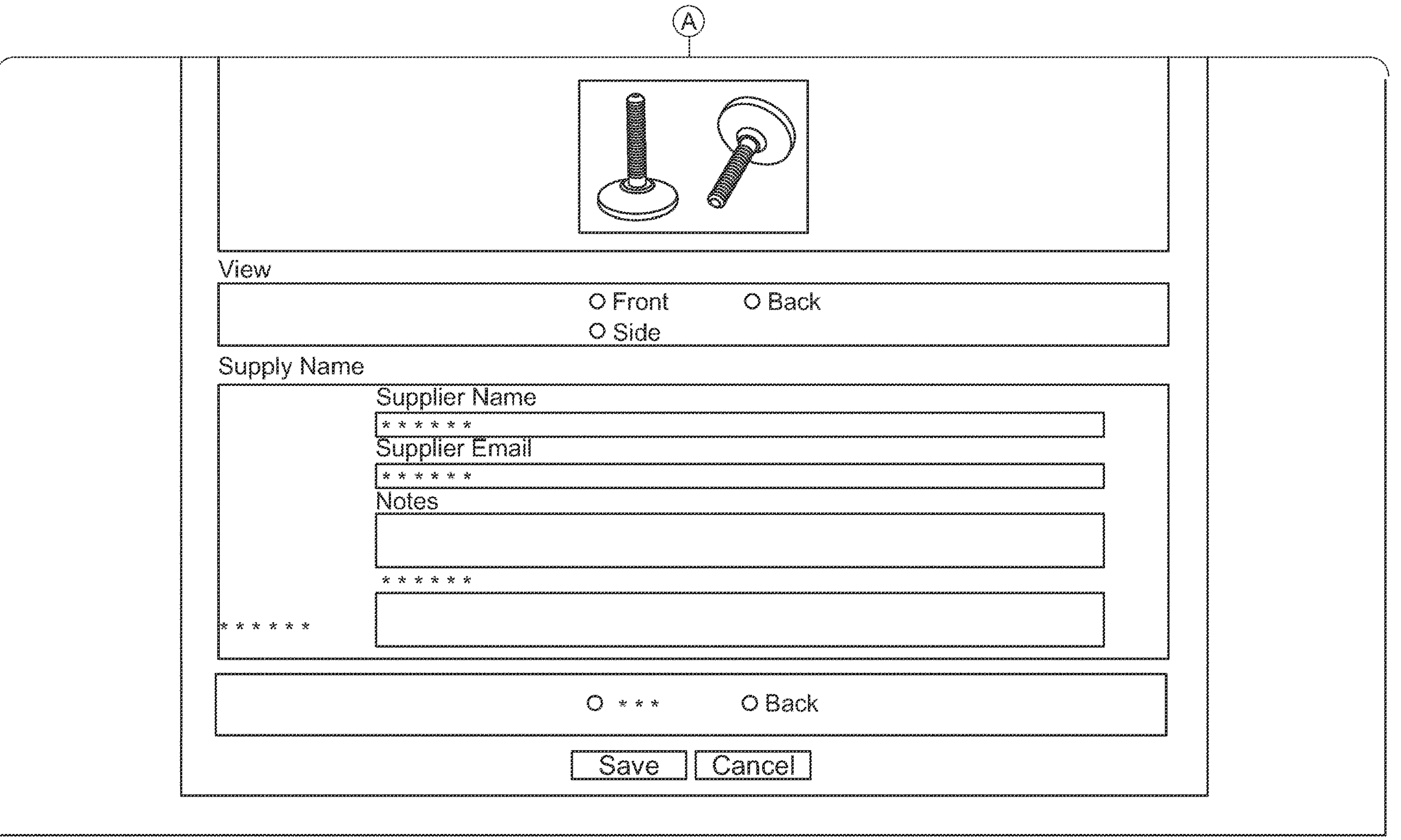
FIG. 8A (Continued...)

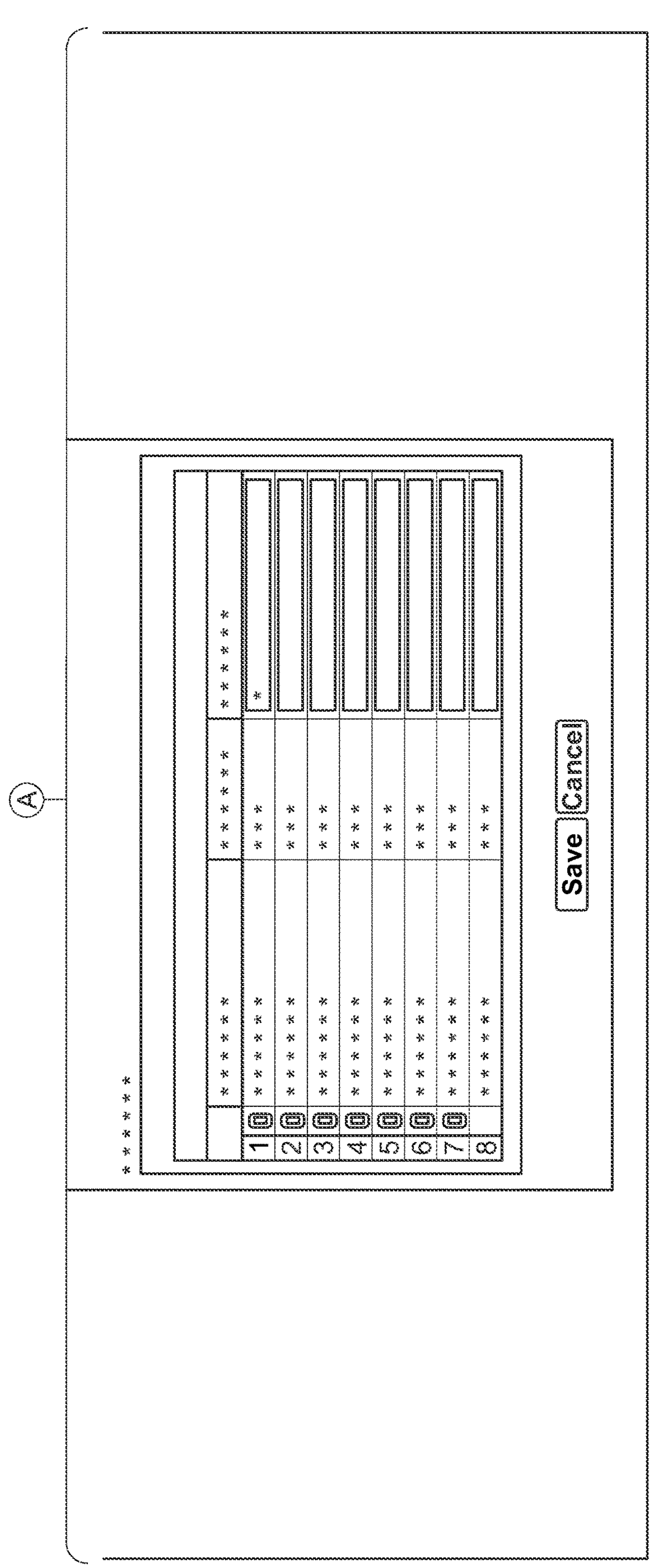
FIG. 8B (Continued...)

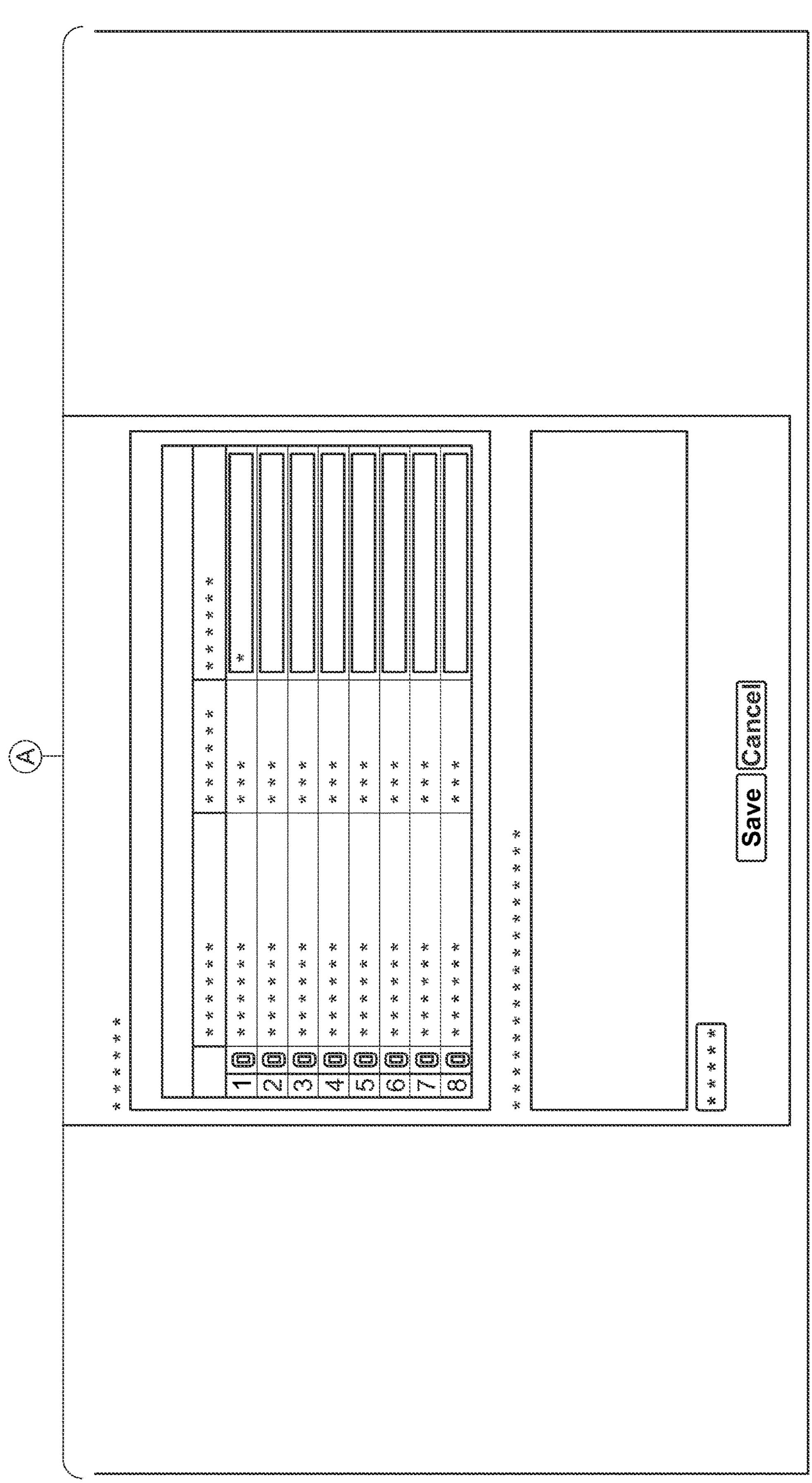
FIG. 8D (Continued...)

DISPLAY FIXTURE CONFIGURATION AND MANAGEMENT SYSTEM

CROSS-REFERENCE TO RELATED APPLICATION

This application is a continuation-in-part of U.S. Non-Provisional patent application Ser. No. 15/369,305, filed Dec. 5, 2016, and titled "DISPLAY FIXTURE CONFIGURATION AND MANAGEMENT SYSTEM," which claims the benefit of U.S.

Provisional Patent Application Ser. No. 62/279,982, filed Jan. 18, 2016, titled "Display Fixture Configuration and Management System," both of which are incorporated herein by reference in their entireties.

FIELD OF THE INVENTION

The present invention relates to the field of managing advertising and product placement. More specifically, the present invention relates to methods, systems, and devices for managing fixtures used for displaying products at retail stores as well as for managing content to be displayed on large screen monitors at such retail stores.

BACKGROUND OF THE INVENTION

Product placement and managing the displays where these products are shown to the public has become a much more competitive and complex matter in recent years. Nowadays, large retailers seek to manage their store displays, advertising, and product placements centrally and with a view towards profit. Gone are the days of haphazard placement of products based on the whim of the store manager or on the whim of the sales staff.

Most chain retailers with large stores spread out across the country want a planned, chain-wide approach to store displays as well as to the placement and display of products. Such an approach, ideally, would take into account stock levels of the various products on display as well as the physical needs for displaying such products. As an example, placing one product with 8-inch wide packaging next to another product with 6 inch wide packaging on a rack that is only 12 inches wide across would not be acceptable. Those setting the chain-wide display policy at the chain retailer's head office may, however, not be aware of the hands-on requirements for such displays.

In addition to the above issue, the maintenance and upkeep of the various displays and fixtures at the various stores of a chain retailer may not be adequately addressed by either the store or those at the head office. Broken shelves, replacements for missing or broken parts of fixtures (such as display stands) may be difficult to find. As well, local employees and even those at head office may not know who is responsible for finding/replacing the missing or broken parts. This leads to inefficiencies and, in many cases, unrepaired fixtures.

Based on the above, there is therefore a need for solutions which mitigate if not overcome the shortcomings of the prior art. Such solutions should, preferably, allow users to freely configure a store's layout including placement of display stands, display shelves, and video monitors. As well, it would be preferable if more than one configuration can be entered for a store. Similarly, it would be advantageous if such solutions allow users to configure each display shelf or display stand based on a store's inventory, the product's packaging, and the shelf s physical dimensions.

SUMMARY OF INVENTION

The present invention provides systems and methods for managing a store's advertising and product displays. A system includes at least one database of products, details regarding each product's various prices, physical packaging dimensions, descriptions, and at least one image of each product. The system allows a user to configure a fixture on which products are to be displayed, including the fixture's physical dimensions. Each display fixture can then be provisioned by the user so that the identity of the products to be displayed on each display peg or shelf, along with how many of that product, is displayed. The system also alerts the user if the provisioning is proper or not, taking into account each product's packaging dimensions. Once provisioned, each display fixture can also be placed on a display/product placement plan diagram of the store by the user. The database may also include a database of the various display fixtures used in the store along with the parts and components of those fixtures. If parts of a fixture are required, a store employee can query the database to determine which parts are required, where those parts are sourced, and how to order those parts.

In a first aspect, the present invention provides a system for managing at least one tangible display fixture in a physical store, the system comprising:

- a display fixture management module embodied in a server, the display fixture management module providing said user with functionality to remotely manage an inventory of said tangible fixture parts of said at least one tangible display fixture;
- said display fixture management module actively communicates with a display fixture database;
- a fixture item entry module embodied in a computer interface providing said user with functionality to enter data regarding the tangible fixture parts for storage in said display fixture database;
- an ordering module embodied in said computer interface or another computer interface providing said user with functionality to order one or more replacement tangible fixture parts for said at least one tangible display fixture; and
- a ticket handling module embodied in said server,
- wherein, upon entry of said user of an order for said at least one of said tangible fixture parts and, based on a price of said at least one of said tangible fixture parts as entered by said user:
- said system automatically generates an authorization request requesting authorization to order said at least one of said tangible fixture parts,
- said system automatically forwards said authorization request to personnel having higher authority than said user placing said order,
- wherein, when said system through said ticket handling module, detects that said authorization request has not been approved or denied after a predetermined amount of time since said authorization request was automatically generated, said system automatically sends reminders regarding said authorization request to said personnel by way of at least one of:
  - an email message to said personnel;
  - a message to said personnel using a chat application;
  - a text message to said personnel using a mobile text messaging application;

an entry in a calendar for said personnel;

wherein, upon receipt of an approval of said authorization request, said system generates a suitable purchase order for said at least one of said tangible fixture parts and automatically forwards said purchase order to a supplier for said at least one of said tangible fixture parts.

BRIEF DESCRIPTION OF THE DRAWINGS

The embodiments of the present invention will now be described by reference to the following figures, in which identical reference numerals in different figures indicate identical elements and in which:

FIGS. 6A-6C are screenshots of user interfaces for use with the fixture and supply management functions of the invention;

FIG. 7 is a screenshot of a user interface illustrating the supplies allocated to a display fixture;

DETAILED DESCRIPTION OF PREFERRED EMBODIMENTS

Figure 1:
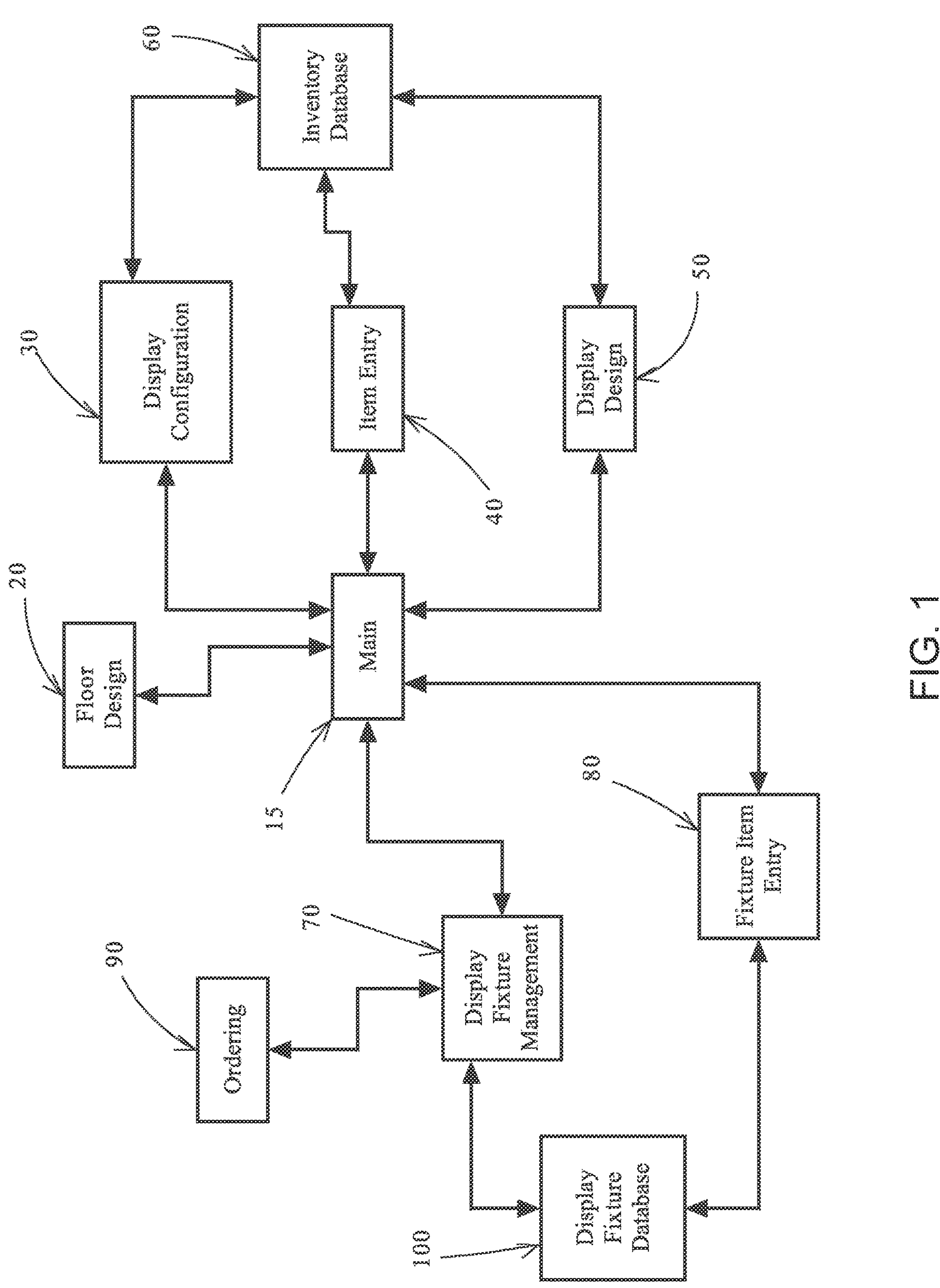
FIG. 1 is a block diagram of a system according to one aspect of the invention.

Referring to FIG. 1, a block diagram of a system according to one aspect of the invention is illustrated. A system 10 includes a main module 15, a floor design module 20, a display configuration module 30, an item entry module 40, and a display design module 50. The display configuration module 30, item entry module 40, and display design module 50 communicate with an inventory database 60. Also part of the system 10 is a display fixture management module 70, a display fixture item entry module 80, and an ordering module 90. The display fixture management module 70, display fixture entry module 80, and ordering module 90 communicate with a display fixture database 100.

In operation, a user accesses the system 10 by way of the main module 15. From the main module 15, the user can design a display plan (i.e. a planogram) for a store using the floor design module 20. The display plan or planogram would detail not just the layout of the store but also the location, type, and configuration of display fixtures throughout the store. The user can also use the display configuration module 30 to manage and/or configure a specific display fixture such as a shelf, cabinet, or display rack. The user can thus designate which products are to be placed on which display fixture, where on that display fixture, and how many of that product is to be placed on each peg and/or rack of that display fixture. Details for each product available to a store can be entered by a user by way of the item entry module 40. These details are stored for each product in the inventory database 60. While the details of the various display fixtures available to a store may be stored in the inventory database 60 or in the display fixture database 100, the user may also custom design a display fixture by way of the display design module 50. The display design module 50 allows the user to design a display fixture by designating the display fixtures height, width, and depth. Once designed, the details of the custom display fixture can be saved in one of the databases and can then be configured by way of the display configuration module 30 and can be used in the floor design module 20.

It should be noted that, to assist the user when configuring each display fixture, within the inventory database, each entry for various products may include a product's size, shape, the physical dimensions of the product's packaging, at least one image for the product, details about the product, the sale price for the product, the product cost, the regular price for the product, the product's manufacturer's suggested retail price, the product's SKU (stock keeping unit), the manufacturer for the product, as well as details regarding reordering of the product.

To manage the various display fixtures at the various stores, the display fixture management module 70 may be used. A user can use the display fixture management module 70 to determine which parts are needed whenever a display fixture requires repairs or replacement. The user can enter the details for the various parts and components for each display fixture. These entries are then saved in the display fixture database 100. It is preferred that the entry for each part or component would include an image of the display fixture that uses the part, a diagram of where the part or component fits in the display fixture, along with details on how to reorder the part or component.

It should be noted that the term "display fixture" used in this document includes display shelves, display cabinets, display racks, counter top displays, pegboard-equipped displays (including free standing displays, wall mounted displays, and counter-top displays) and any other device or item which is used to display one or more products or one or more pieces of advertising. The term may thus also include picture frames, poster frames, video monitors, television monitors, computer workstations used to display software or videos, etc.

Figure 2:
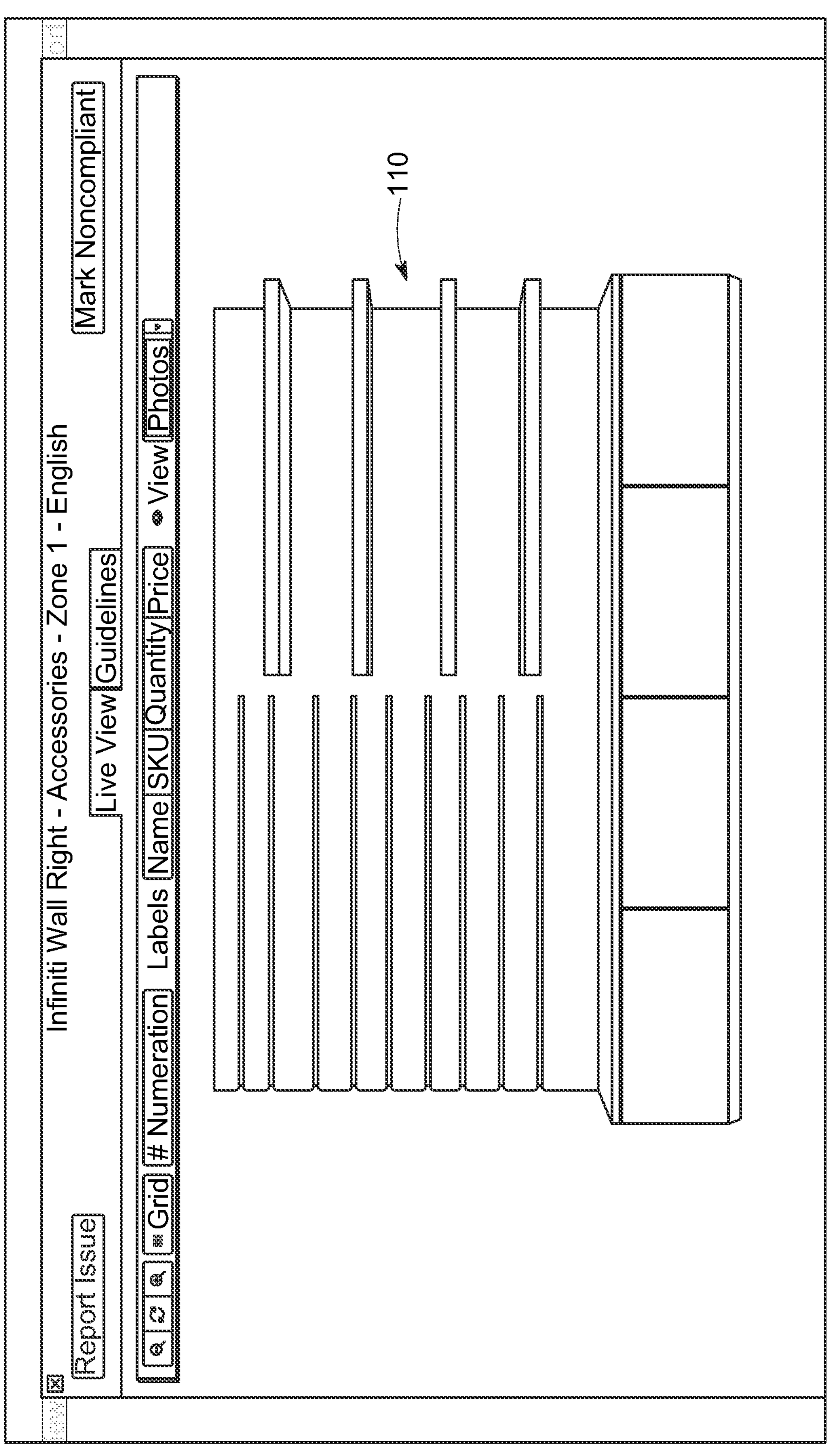
FIG. 2 is a screenshot of a user interface illustrating a display fixture to be configured.

Referring to FIG. 2, a screenshot of a user interface associated with the display configuration module 30 is illustrated. As can be seen, an image of a display fixture 110 is presented. In one implementation, the display fixture 110 is a standard display fixture and its physical dimensions and image are stored in the display fixture database 110 and can be called up by the user for configuration either before or after the display fixture is placed on the storewide planogram. Once the desired display fixture has been either selected from preconfigured display fixtures in the display fixture database or created using the display design module 50, the display fixture can be configured by populating the various storage options on the display fixture (e.g. pegs, shelves).

Figure 3:
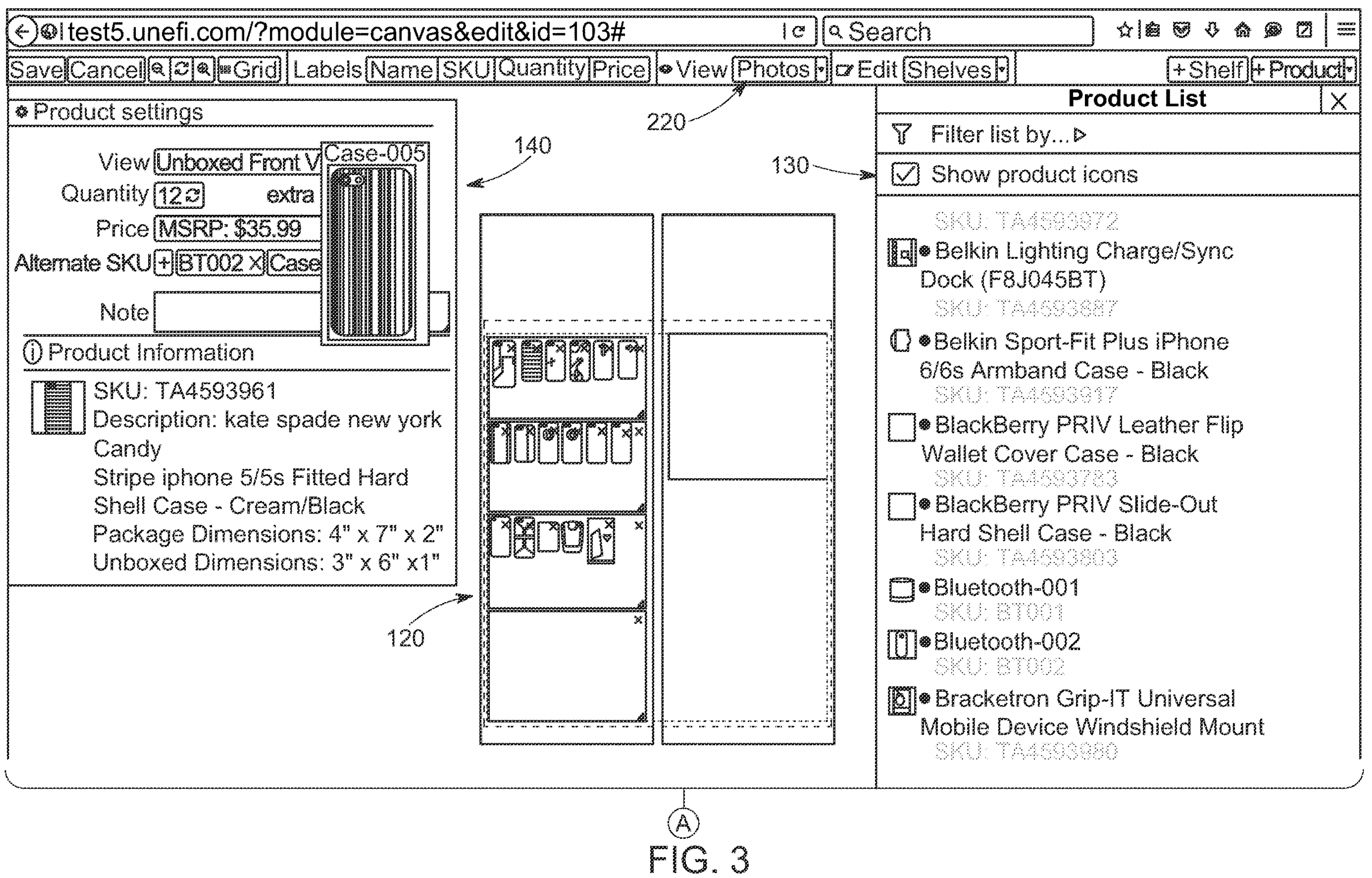
FIG. 3 is a screenshot of a user interface for use with the display fixture configuration module.

Referring to FIG. 3, a user interface for the display configuration module 50 is illustrated. As can be seen, the user interface has a section 120 for the display fixture. A product list 130 lists the various products available for placement on the display fixture. A user can click and drag an item from the product list 130 to the display fixture.

Doing so will place a picture of the selected product on the relevant section of the display fixture. It should be noted that the physical size of the display fixture is known to the system along with the physical size of the product packaging and, on the user interface, all images are scaled accordingly so that relative sizes are preserved. When a product is selected from the list 130, a window 140 opens up to show the settings for that specific product. The window 140 provides details for the selected product including the view for the product's image (e.g. front view, side view, packaged view, unpackaged view), the product's SKU, a description for the product, the product package's dimensions, a quantity of the product (i.e. how many units of the product are in inventory), and the various prices for the product (e.g. the product's MSRP, the cost for the product, the regular price for the product, and a sale price for the product). An image for the product is also displayed when the product is selected. Of course, multiple images of each product may be stored on the database based on the view of the product. A user may upload one or more images per product as desired.

It should be noted that the window 140 also has an entry for an "alternative SKU" for the selected product. This alternative SKU details a product which can be used or displayed in place of the selected product in the event there are no more units of the selected product available to the store. Alternatively, the "alternative SKU" can detail a product which can be placed behind the selected product on the display fixture's peg or shelf.

Figure 4:
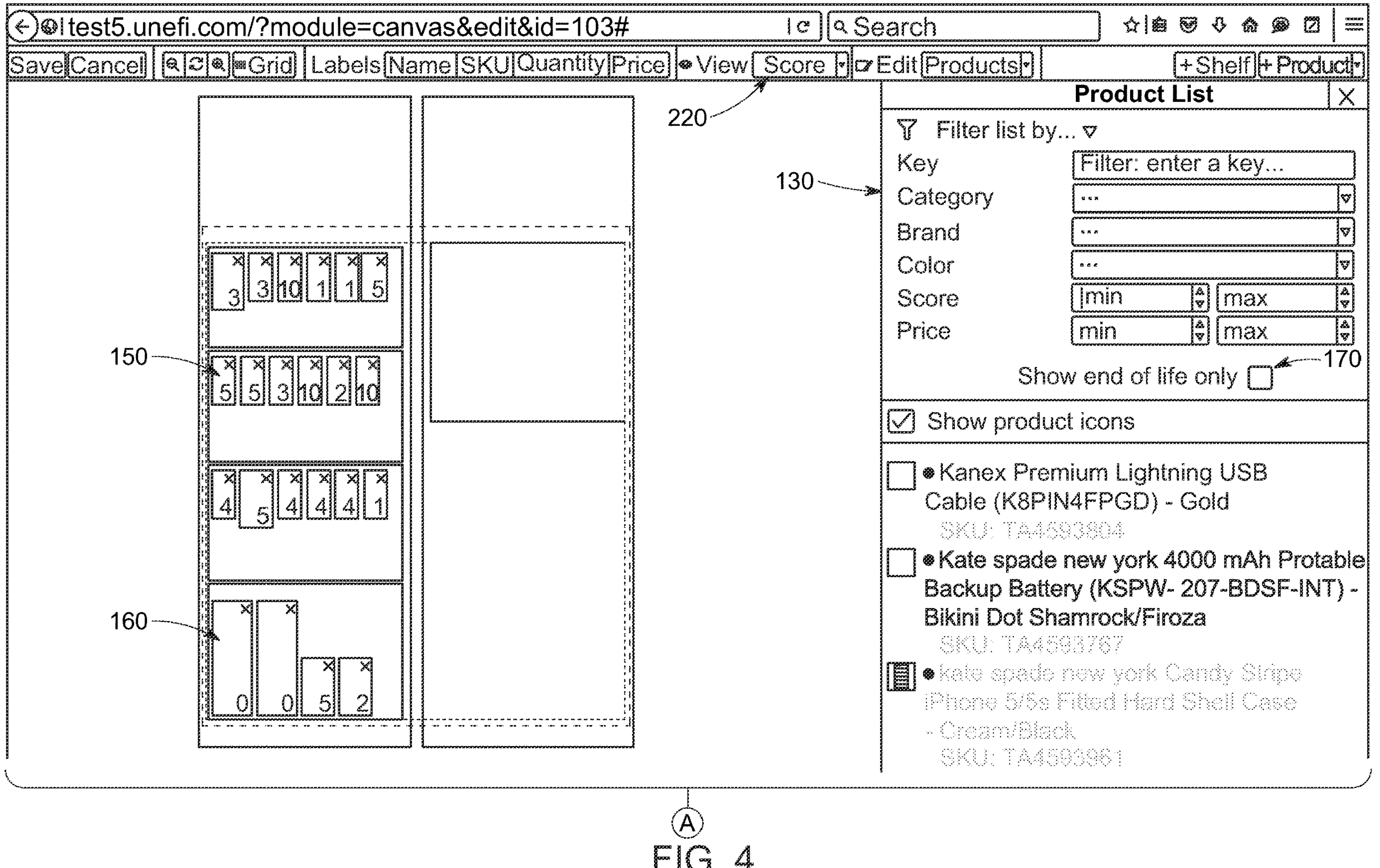
FIG. 4 is another screenshot illustrating another view of a user interface which may be used with the display fixture configuration module.

The view of the configured display fixture in FIG. 3 shows how the display fixture will look in the store. In FIG. 4, another view of the configured display fixture is illustrated. In FIG. 4, instead of the image of the product's packaging, a block which preserves the relative size of each product is used while other pieces of information are displayed on each product. In one implementation, each product is grouped by product category and each product category is illustrated by a different color. This allows the user to see how many products from each category are displayed on the display fixture. In another implementation, each product that has been selected and placed on the display fixture is identified on the product list by having the corresponding entry in the product list colored differently from products which have not been placed on the display fixture. This allows the user to quickly see which products on the list are not currently selected for the specific display fixture.

Another feature illustrated in FIG. 4 is that of scoring. A product's score may be based on the product's relative sales performance (i.e. how many of that product was sold relative to other comparable products) or on that product's profit margin. For sales performance, the system can import sales data from one or more suitable sources such as from a separate accounting database or from a user provided spreadsheet. For a profit margin based score, the product's entry in the inventory database would contain the product's per unit cost along with the product's retail price. Scoring is relative in that a product's score may be relative to other products selected and placed on the display fixture or a product's score may be relative to other products in the same category. Once scored (e.g. on a 10 point scale—other scales may, of course, be used), a product's score is illustrated on the product's box on the user interface as illustrated in FIG. 4. As an example, item 150 has a score of 5 while product 160 has a score of 0. By being able to simultaneously color code the products on the display fixture being configured and to score or rank these same products, a user can balance profitability with product exposure, product selection, and product diversity on the same display fixture.

It should be noted that the scoring feature mentioned above can also be used to color code the various products selected for the display fixture in FIG. 4. In one implementation, the scores are divided into three divisions with one division being products having a score of 10-7, a second division being products having a score of 6-3, and a third division being products with a score of 2-0. Each division is assigned a different color. By color coding the blocks for the products displayed on the display fixture, a user can quickly determine how many products of each division is to be displayed on the display fixture. Since a product's score can be determined using any number of bases (e.g. price, profit, quantity, etc., etc.), the user can thus quickly view the ramifications of the selected products based on any one of the multiple score bases. As an example, if a user wanted to see the profit distribution of the selected products on display, the products can be scored based on profitability and then color coded based on that profitability score. Thus, if green is selected as the color for most profitable products, yellow is selected for medium profitability products, and red is selected for minimal profitability products, the user can quickly view how many of each type of product is on the display fixture. Not only that, but the user can also use this feature to position products on the display fixture based on the product scores.

FIG. 4 also illustrates that each of the products placed on the display fixture can be labeled by product name, SKU, quantity, or price. Thus, instead of a product's score, the product's box on display fixture on the user interface can display that product's name, SKU, retail price (or cost price), or how many of that product is displayable on that display fixture's peg or shelf (i.e. quantity). It should be noted that, to display a product's quantity, the system uses the product's physical packaging dimensions along with the display fixture's physical dimensions to calculate how many of that product can be displayed. As an example, if a product's packaging has a depth of 5 cm and the display fixture has a usable depth of 30 cm, then only six instances of that product can be displayed on the display fixture's shelf or peg. This allows the user to determine how many of each product can be displayed on the display fixture. Thus, the user may see if 5 instances of a first product (housed in large packaging) is more suitable than 10 instances of a second product (housed in smaller packaging).

Yet another feature of the system is illustrated in FIG. 4. In the product list 130, the list can be filtered by any number of criteria including product category, brand, color, score (whether price based or quantity based), or price. Products which meet the user entered criteria are then listed on the product list 130. Another feature of this filter function is the end of life button 170. When selected, the product list 130 only lists products that have been discontinued, are on remainder, or are no longer available. This feature allows the user to quickly view which products can be displayed for a quick sale or which can be deeply discounted. It should be noted that the filter function can be used in addition to the end of life button. This, a user can not only view which products are at their end of life but these products can further be filtered based on the numerous criteria listed above.

Figure 5:
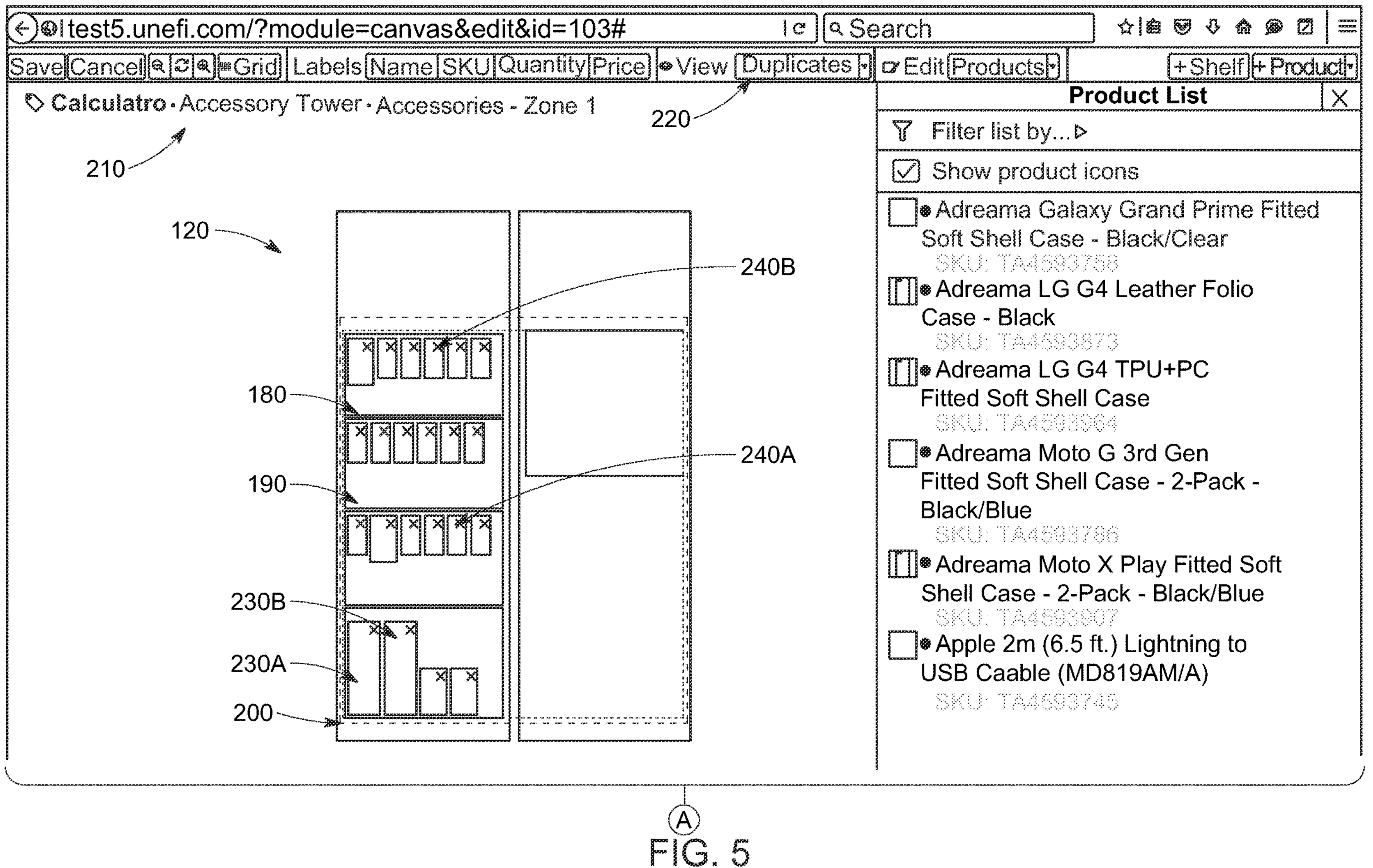
FIG. 5 is yet another screenshot of a further view of a user interface for use with the display fixture configuration module.

Referring to FIG. 5, another feature of the system is illustrated. To determine if a configuration of a specific display fixture is feasible or not, the configuration module visually shows the user the result of his or her choices. As can be seen, shelf 180 on the display fixture 120 has seven products. However, there is only enough space on the shelf 180 to accommodate six products. This can be seen as the seventh product is clearly outside the bounds of the display fixture. As noted above, the relative physical size of each product's packaging is retained when being placed on the display fixture. Similarly, the display fixture's physical size is retained relative to each product's packaging. This allows the user to visually see whether his or her configuration of the display fixture is feasible or not. A user merely has to drag a product from the product list 130 to a specific shelf on the display fixture 120 to place that product on the shelf. In the event a product cannot be accommodated on the display fixture (such as in the case of shelf 180), the shelf changes color to alert the user. In FIG. 5, the shelf 180 is of a different color than shelf 190 or shelf 200. As noted above, the system determines whether a user's product placement can be accommodated or not based on the physical sizes of the various products placed on the display fixture as well as the physical size of the display fixture itself.

It should be noted that shelf 200 is one where products are placed on while shelf 190 and shelf 180 are, in their real-world manifestation, equipped with pegs from which products are hung.

Also shown in FIG. 5 is one viewing choice for the products placed on the display fixture. A menu bar 210 at the top of the user interface has a choice 220 for viewing the products. In FIG. 5, the DUPLICATES choice is selected and this means that products are color coded based on their category. This shows the user which products on the display fixture are of the same category. The bottom products 230A, 230B are of one category while products 240A, 240B are of a different category as these are of a different color. Another viewing choice, shown in FIG. 3 is that of PHOTOS. In FIG. 3, the choice 220 has PHOTOS selected and, as such, the products on the display fixture are represented by their photographs instead of by simple boxes as in FIG. 5. In FIG. 4, the viewing choice selected is that of SCORE and the various products are thus illustrated with their score inside their representative boxes. Of course, regardless of the viewing choice, each product's representation retains its size relative to the other products and relative to the physical size of the display fixture. This allows the user to thus see whether a product will fit on the display fixture or not regardless of the viewing option.

In another aspect of the invention, the system includes display fixture management module 70 noted in FIG. 1. A user can create and edit entries for parts and components of display fixtures by way of the fixture item entry module 80 with entries being saved in the display fixture database 100. Parts and components can be ordered using the ordering module 90.

Figure 6B:
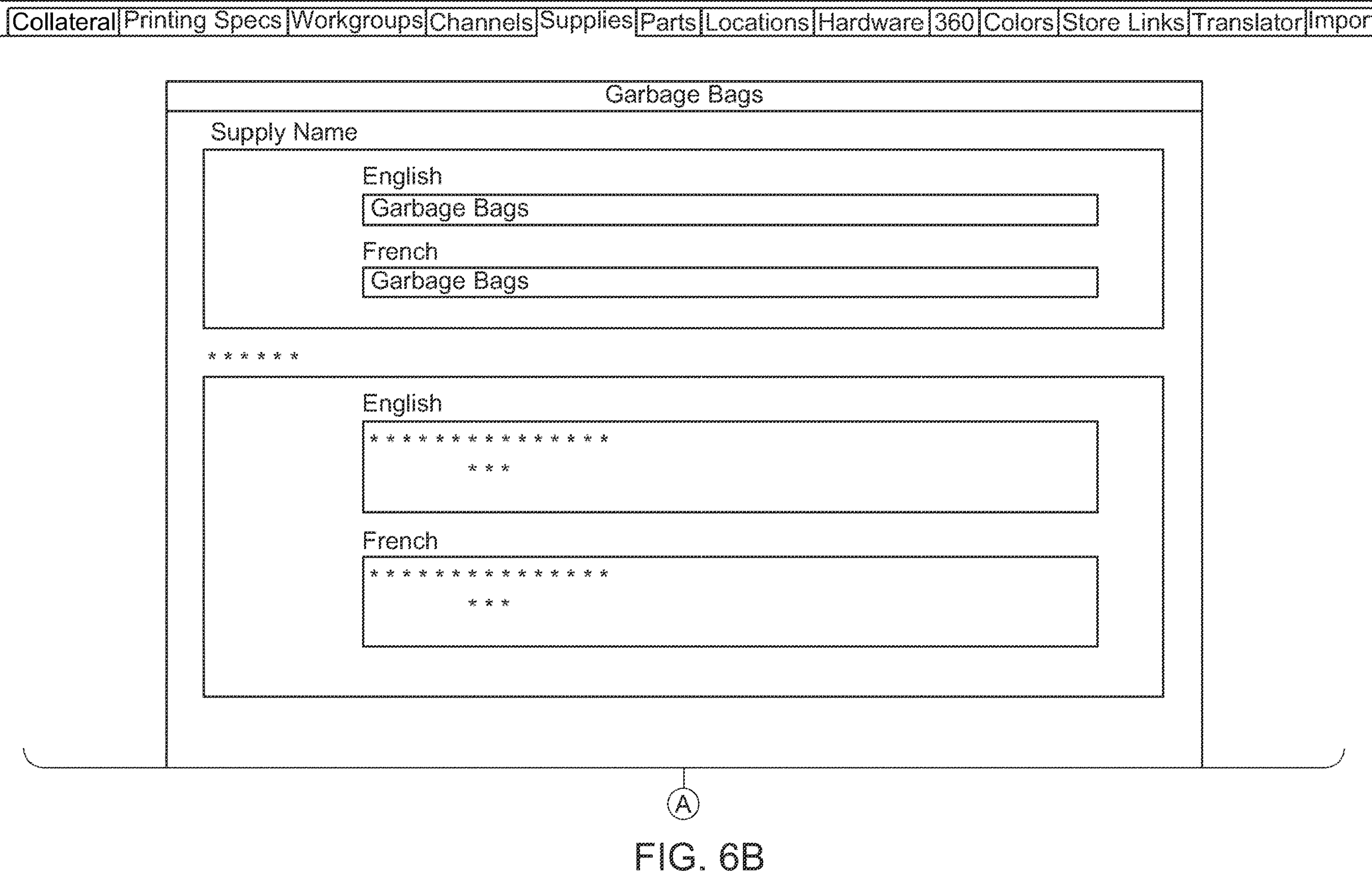
Figure 6C:
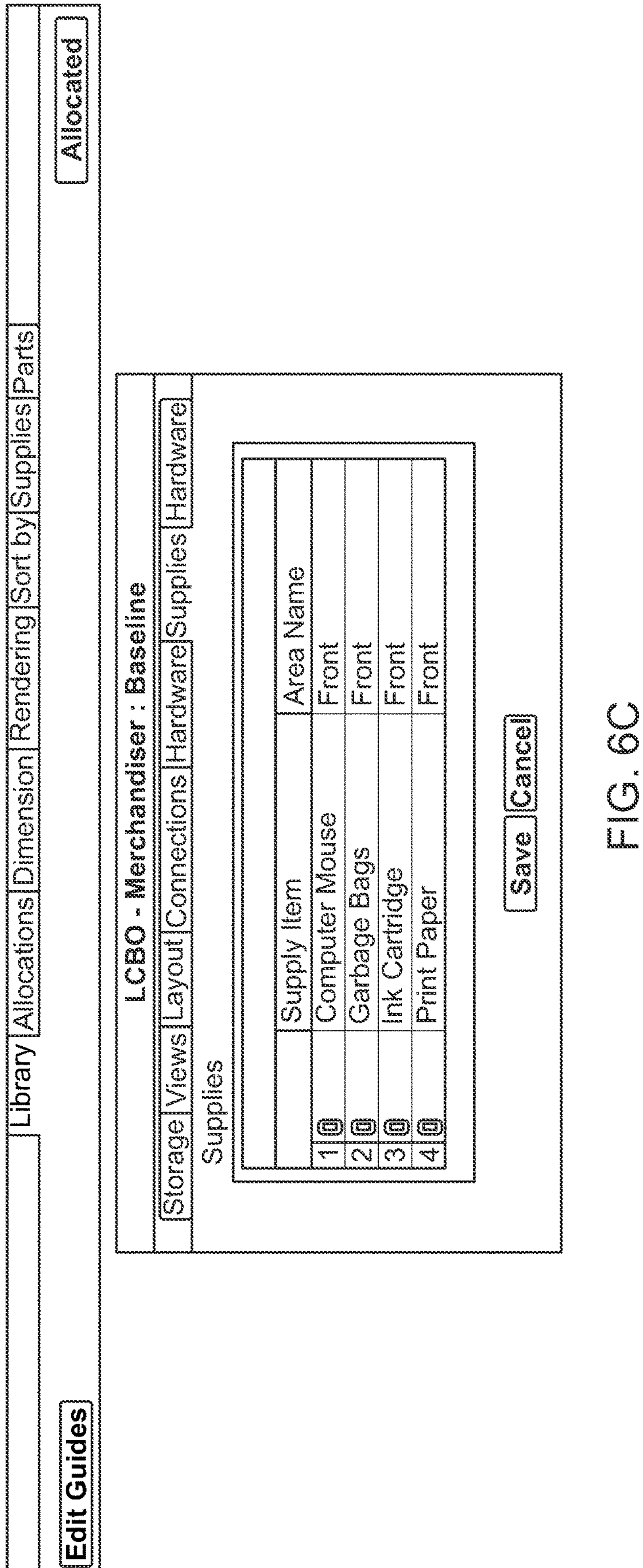

Referring to FIG. 6A, a screenshot of a user interface for the fixture item entry module 80 is illustrated. As can be seen, a user can create entries for parts, components, and supplies for use with display fixtures or, indeed, for parts, components, and supplies of any fixture. This may include parts and components, consumables (e.g. printer cartridges, paper, garbage bags), and any other supplies that may be needed by a store. Referring to FIG. 6B, once the entry has been created for the supply item, details can then be added to the entry. These details may include an image of the item, the name of the item, a description of the item, a quantity of the item usually ordered (e.g. a box of paper containing 10 reams of paper with each ream containing 200 sheets), a regular or usual supplier for the item, contact information for the supplier (e.g. telephone number, a main contact email address, an alternate contact email address, and a physical address), a website for the main supplier, and any other details which may be helpful when ordering the item. Once the details are entered and the entry has been made, each fixture can be allocated with one or more relevant items. In FIG. 6C, each fixture is allocated at least one supply. To assist in determining which item applies to which part or area of which fixture, each fixture with multiple parts of the same type are assigned numbers and letters as necessary. Thus, a cabinet fixture with three drawers would have Drawer A, Drawer B, and Drawer C, each of which may have multiple parts, components, or supplies. The cabinet fixture may have Door A and Door B and each door can be allocated a specific hinge. Similarly, blank rolls for a cash register might be kept in Drawer A of the cabinet while pens might be kept in Drawer B. These consumable supplies would thus be allocated to the cabinet fixture and to their specific location (e.g. Drawer A or Drawer B as the case may be).

Referring to FIG. 7, a user interface for the ordering module 90 is illustrated. In the example, the fixture is noted as being a side counter kiosk with multiple drawers. As can be seen, each supply item allocated to the kiosk fixture is listed along with a description of that supply item, notes regarding ordering the item, the location/area of the supply item on the fixture, as well as a blank area where the user can enter how many of each item to order. A user can thus check a box 250 to order an item. To assist the user when selecting which items to order, clicking on an item opens up a window which shows an image of the selected item along with a title and/or description of the item. Thus, before a user orders an item, he or she can confirm that it is the item they want by checking the image of the item selected.

As another aspect of the invention, the system also allows for parts and components for fixtures to be easily ordered. As with supplies, entries for each part or component can be created and each part's entry can include as much information as necessary for the proper ordering and use of the part. Each part can then be associated with a specific fixture and the location of that part is illustrated on an image of the fixture. Conditions and actions specific to the part can also be entered so that the issue with the part can be addressed. As an example, a drawer on a fixture can be designated as "STICKING" (i.e. does not slide out smoothly), "BROKEN", "JAMMED", or "LOOSE". A suitable work order or request for repairs can then be generated by the system.

Figure 8A:
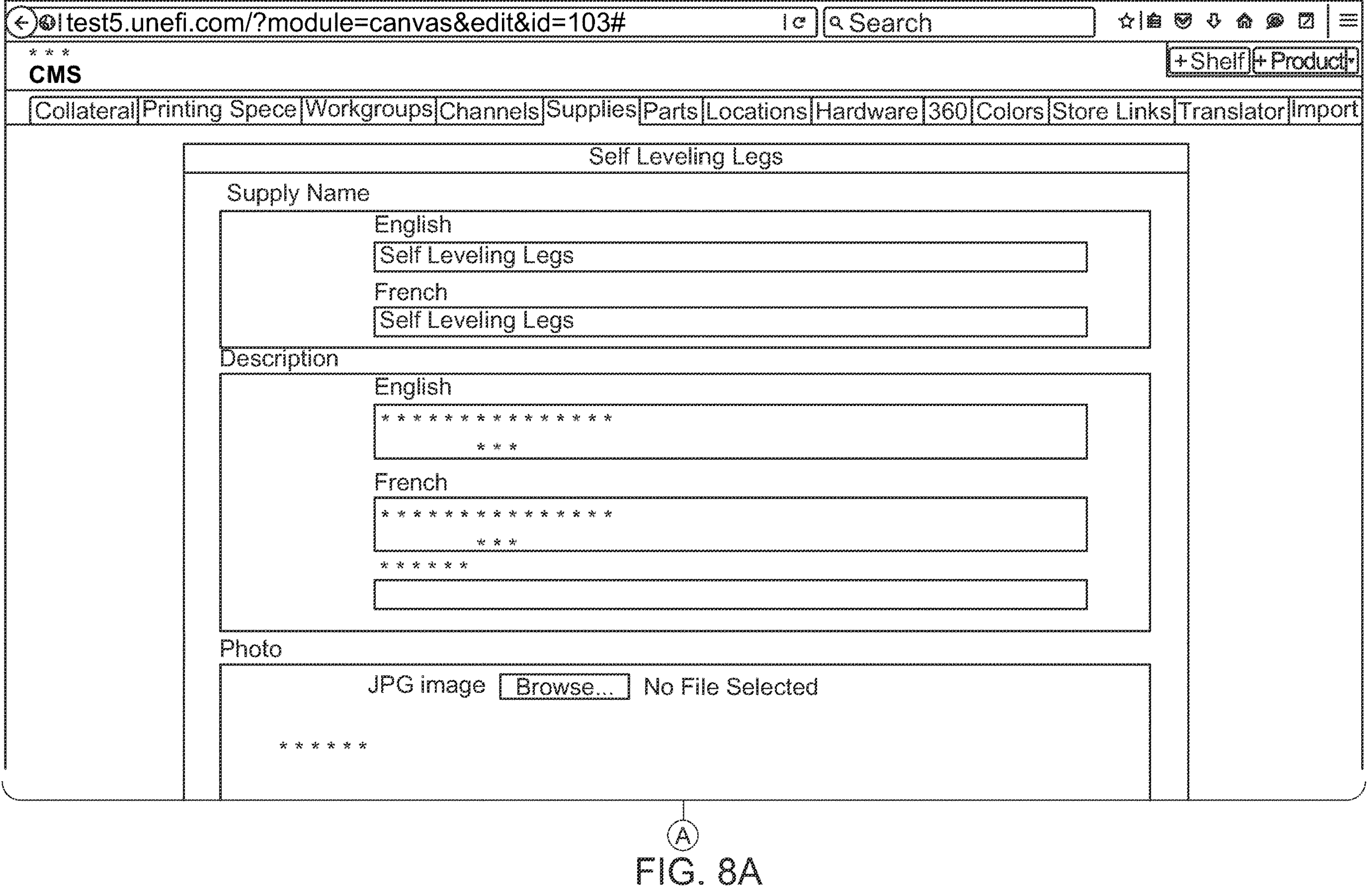
FIGS. 8A-8E are screenshots of user interfaces for use with the fixture item entry module as well as with the fixture management module of the invention.
Figure 8B:
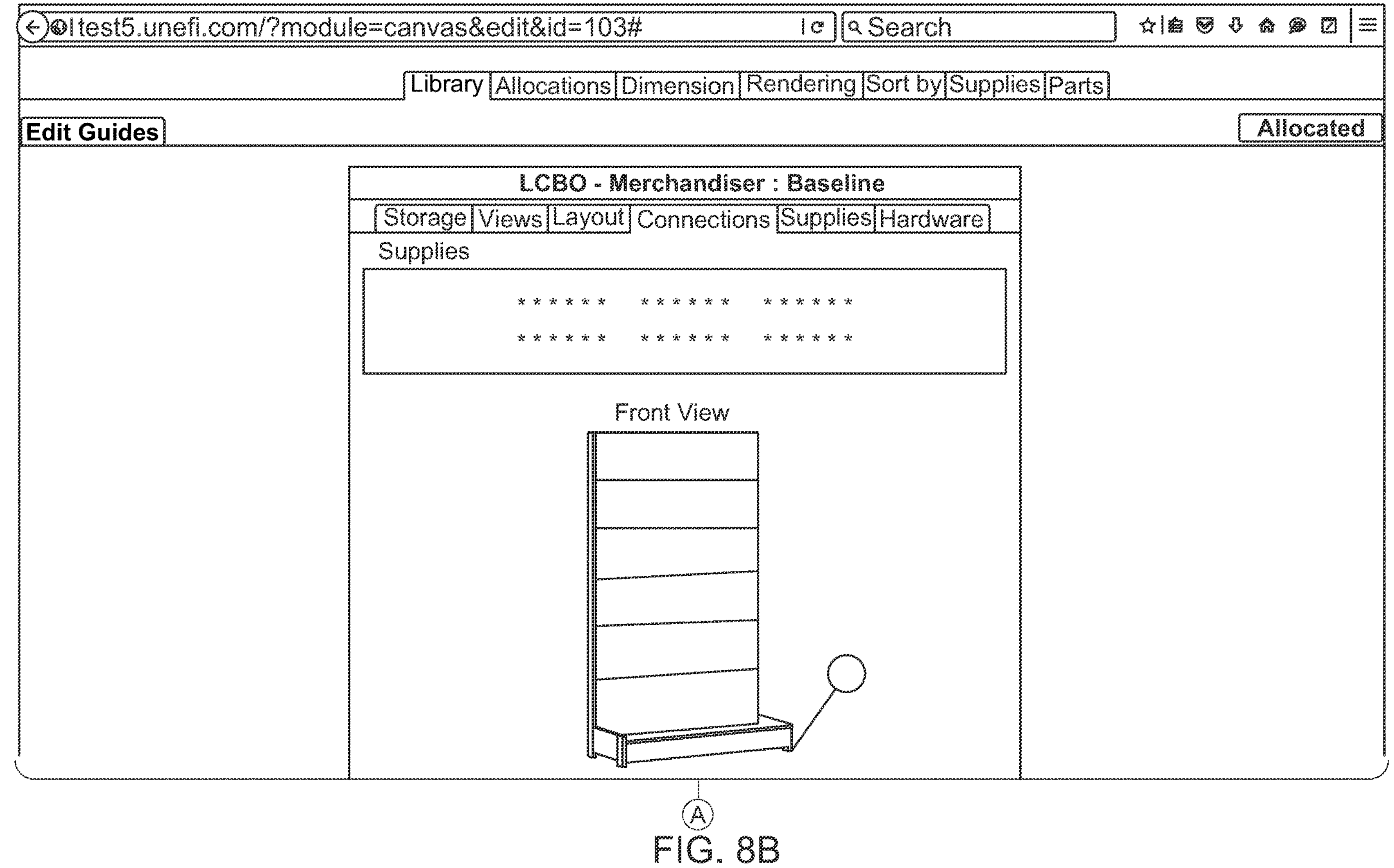

Referring to FIG. 8A, a part entry creation user interface is illustrated. This interface can also be used by way of the fixture item entry module 80. As can be seen, an image of the part can be provided by the user, along with a description of the part and details about ordering the part (e.g. a source supplier for the part, contact emails for the supplier, contact number for the supplier). Each part can then be associated with a specific fixture and the location of that part on the fixture is detailed in an image associated with the part and the fixture. In FIG. 8B, a user can thus call up a fixture and associate a part with that fixture. An image of the fixture is brought up and the user merely has to indicate where the part is located on the fixture. In the example provided, the self-leveling legs illustrated in FIG. 8A is associated with a free-standing display rack and the location of the legs is indicated on the image of the fixture by the user by way of the arrow.

Figure 8C:
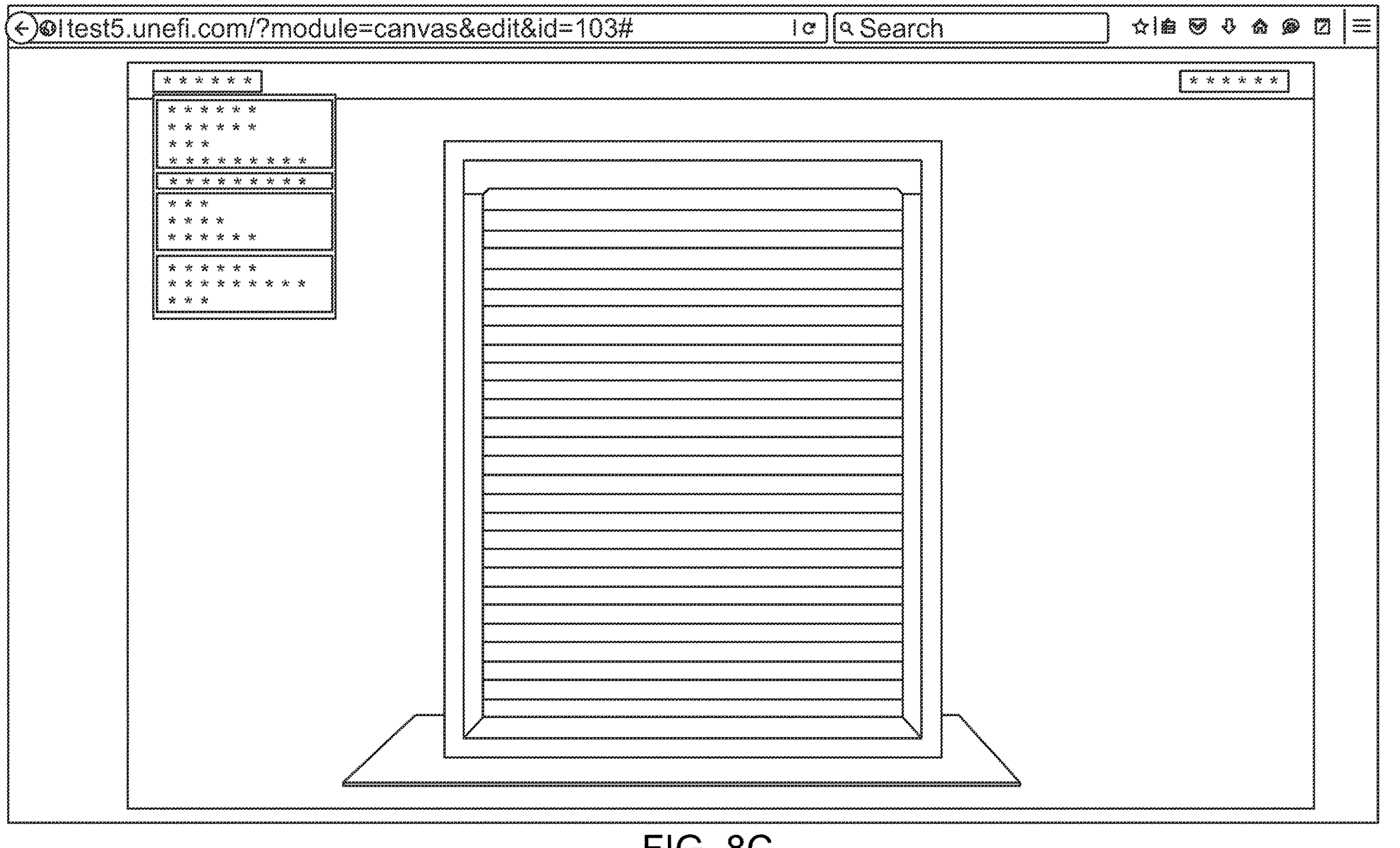
Figure 8D:
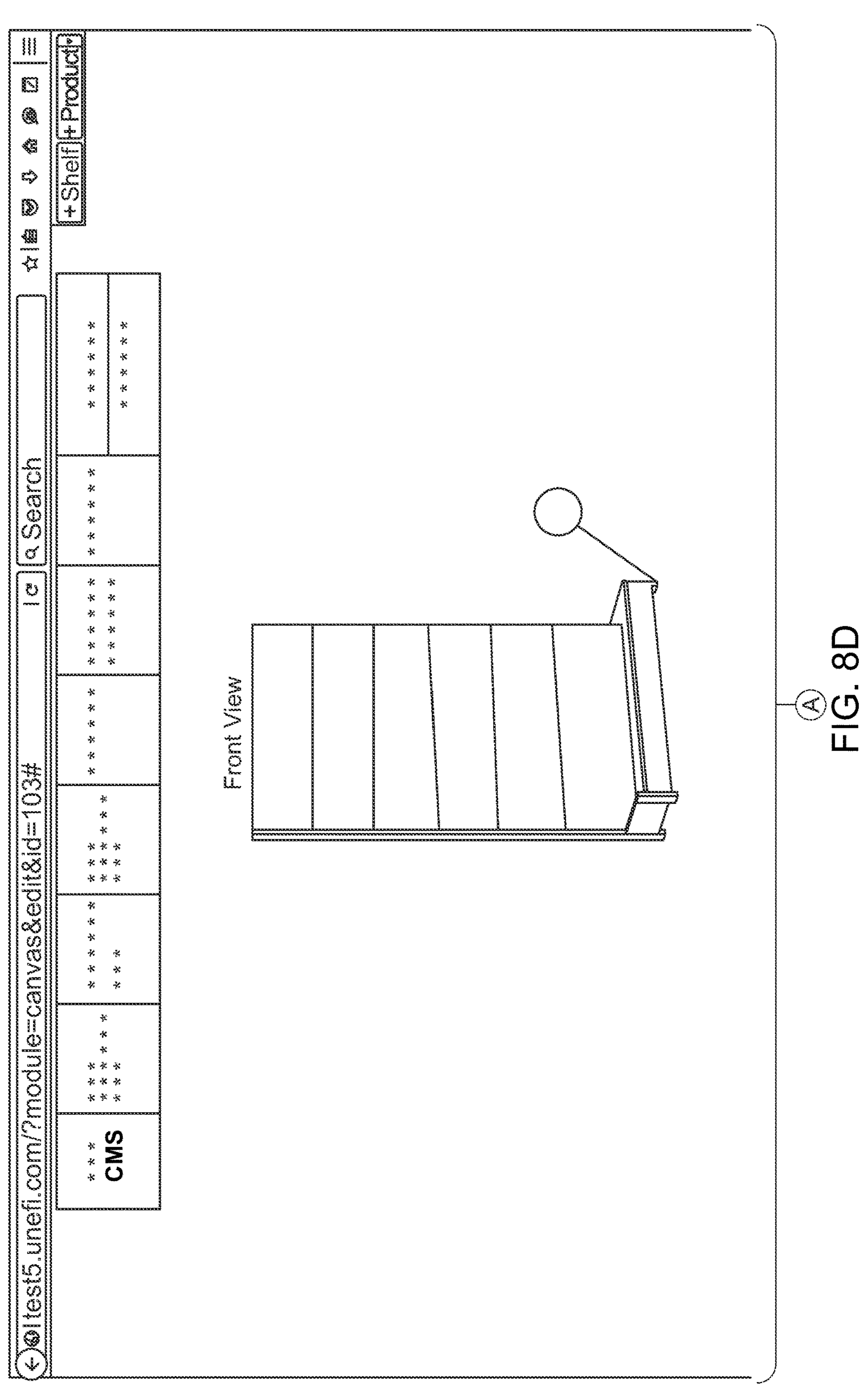
Figure 8E:
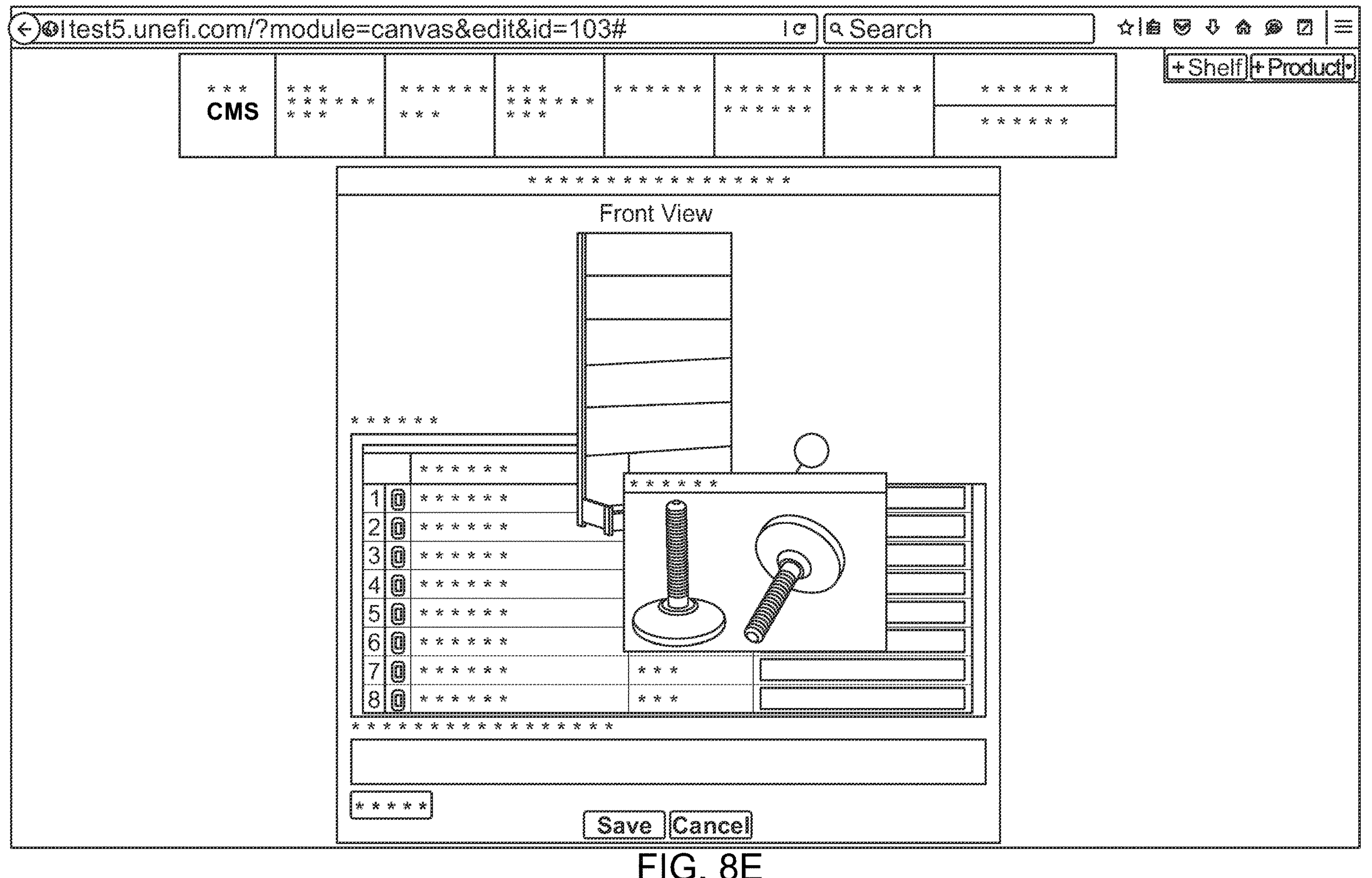

In use, the user selects a fixture in need of a part from a list of fixtures from the display fixture database 110. An image of the fixture is then provided to the user to ensure that the correct fixture has been selected (see FIG. 8C). An image of the fixture with arrows indicating the location of the various parts for the fixture is then provided to the user (see FIG. 8D where only one part is indicated). The user can then view images of the various parts to see if it is the part needed for that fixture. Clicking on each part brings up an image of the part (see FIG. 8E). Once the user has located the correct part by checking the part's location on the fixture and the image of the part, the user can then initiate the ordering process for either the part or for a repair or maintenance request. The repair or maintenance request can include the condition of the part or the issue with the fixture. As in the example above, if the part is a drawer, the condition of the drawer or the issue of the drawer can be indicated in the request.

It should be noted that the ordering process for the part or for a repair or maintenance request can be passed on to the ordering module. Depending on the customer, the repair request can be forwarded to a specific company that deals with all of that customer's maintenance needs or it can be forwarded to the customer's head office for handling. Similarly, any order for supplies can also be passed on to the ordering module. A supply order, the details of which can be extracted from the user's entries, can thus be forwarded to a specific company that deals with all supplies from a specific customer. Or, based on the contact information for an item's supplier, an automated email detailing the desired supplies, the quantity of these supplies, and a desired delivery date can be generated from the order. The automated email can then be sent to the primary contact email for the supplier.

To address each order or request, whether it be a supply order, a part order, or a maintenance or repair request, a ticket-based subsystem may be used. For such a ticket based subsystem, each order or request sent to a supplier, to head office, or to another department generates a specific open ticket. These open tickets are deadline based with a specific desired completion date. Once the order or request has been granted or dealt with, the user can login to the system and close the ticket for a particular order or request. Thus, if an order for paper has been received by Store A, an authorized user in Store A can login to the system and close the ticket for that particular paper order. Similarly, a maintenance request sent to head office from Store B, once completed, can be closed by an authorized user from Store B by logging into the system. However, tickets for uncompleted orders or requests remain open and are assigned a complete-by date. If a ticket is still open by its complete-by deadline date, the ticket is automatically escalated to a higher level. As an example, if a repair request is sent to a contact at head office and is uncompleted by its deadline date, the ticket originally generated is automatically sent to another contact at head office with the other contact being higher up the corporate structure than the original contact. Thus, as an example, if the original contact for a maintenance request is a maintenance person in an organization, the follow-up ticket is escalated to the head of the maintenance department in the organization. Similarly, for supply orders, if the original contact for the supplier is a sales person, the alternate contact can be the head of sales for that supplier.

The ticket-based subsystem may be implemented by a ticket handling module that generates tickets, tracks tickets, opens and closes tickets, and automatically escalates open tickets.

Figure 9:
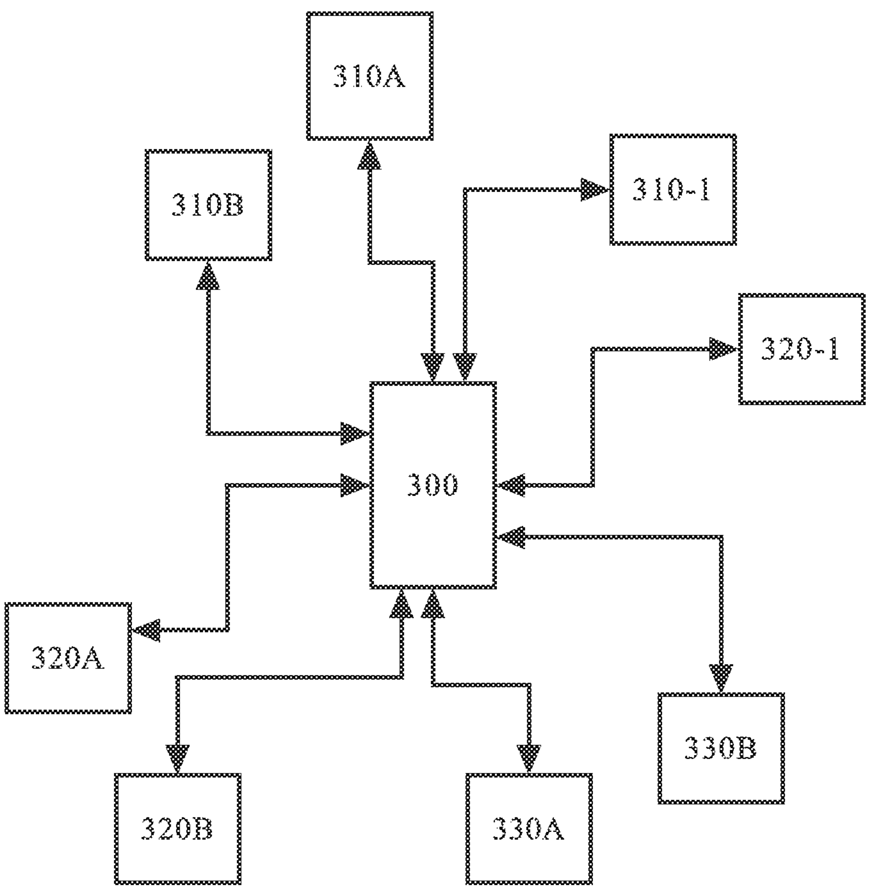
FIG. 9 is a block diagram used to illustrate the connections between a server and multiple users as envisioned for the present invention.

It should be noted that the system noted above can be implemented on a dedicated server system and can be provided to multiple corporate customers on a software as a service model. Referring to FIG. 9, a server 300 implements the system according to one aspect of the invention. The server 300 is accessed by users 310A, 310B from corporate customer AA. The server 300 is also accessed by users 320A, 320B from corporate customer BB. Similarly, users 330A, 330B from corporate customer CC also accesses server 300. Sales data for customer AA is accessed by server 300 and is integrated into the database 310-1 for that corporate customer. Sales data, fixtures data, and inventory data for customer BB is accessed by server 300 and these data sets are integrated by the system into the database 320-1 for customer BB. Customer CC provides inventory data to the server 300 by way of a spreadsheet and this inventory data is incorporated by the system into the database for customer CC. It should be clear that the databases for the various corporate customers are logically if not physically separate such that data for one customer is not accessible by any other customer.

The server 300 can be used to manage the display fixtures for the various stores of corporate customer AA across the country while customer CC only uses the server 300 to generate planograms for its three stores in a specific metropolitan area. The server 300 can also be used to manage customer BB's various displays and video monitors.

In another embodiment, the system allows for the automated generation of purchase orders and for the automated escalation of approvals and/or authorizations for purchases.

As noted above, the system allows users to select broken parts or components of fixtures for automated ordering. The system provides a user interface that shows the fixture in an exploded view and each component is individually selectable from the user interface. After a specific component is selected from the user interface and confirmed by a user, that specific component is automatically ordered from a preconfigured supplier.

It should be clear that specific components may be associated with other components such that ordering one specific component causes the ordering of the other associated components. As an example, ordering a hinge may cause the automated ordering of the screws necessary for that hinge. Similarly, ordering a door for a fixture may also cause the automated ordering of the associated hinges, screws, decals, and handles associated with the door.

To ensure that the correct component is selected, the system may also have a guiding module that guides the user through the selection process by way of guided questions. The user is initially asked about the fixture/device that requires repair/replacement. The user is provided with a selected menu of available fixtures/devices from which to select a fixture or device. Alternatively, the user may be presented with a floor plan of the retail space and the user can select which fixture/device requires repair. As the system has a record of each fixture and device in that specific retail space, the type of fixture or device can thus be isolated.

Once a fixture or device has been selected/isolated, the user is then guided by a sequence of questions and easy to implement suggestions to either remedy the issue or to further isolate the issue. As an example, if the user indicates that a cable that connects a TV to a video source is broken/needs replacement or repair, the system may suggest that the user use another cable that is available to test if the issue is resolved. If the issue is resolved, then it is the cable that requires replacement. If the issue is not resolved, then the video source or the TV may require replace/replacement. The guided questions may be implemented using a decision tree data structure such that questions and suggestions provided to a user are based on that user's previous answers. Once the component that needs repair/replacement has been isolated/identified through the guided questions, the system produces a recommendation as to which part/component requires repair/replacement. The user can then approve the recommendation and the component is then automatically ordered from a supplier as long as specific conditions are met. As well, if necessary, a work order to install/repair the component is generated and forwarded to the necessary organization/person for execution.

As another feature of the system, the system may use a machine learning/AI configuration that uses past orders and/or past purchasing data to learn patterns of ordering components and/or fixtures. The system may use a database of previous orders as a dataset to train a machine learning/neural network system for automated ordering or automated recommendation of components. Thus, the system may learn that, based on previous data, ordering a hinge usually requires ordering specific screws as well. Once the machine learning module has been trained, any ordering of components/fixtures may also produce a companion recommended component that is based on previous ordering data. It should be clear that, in addition to automated ordering of other components or automated recommendations for ordering, the system may also recommend a service call or an installation call for the ordered parts. As an example, a user may order a cabinet door for a display cabinet as a replacement. The system can then recommend (or automatically order) the ordering of screws and hinges for the replacement door based on previous orders of the same or similar doors. As well, the system may automatically schedule a service call for the installation/replacement of the cabinet door. Or, alternatively, the system may recommend that the user ordering the cabinet door also create/schedule a service call for the installation of the cabinet door. It should be clear that the automated ordering or automated recommendation of components and/or services may be hardwired into the system or it may be "learned" by the system using previous data. As an example, for a hardwired or hard coded embodiment, the data entry for a cabinet door may be flagged or associated with specific screws and hinges and a specific service call such that every time the cabinet door is ordered, a set number of specific screws and a set number of hinges are also ordered. Similarly, every time the cabinet door is ordered, a service call or work order is automatically generated as the cabinet door is associated with a specific type of work order. Or, instead of hard wiring the associations between components and/or service/work orders, the system can "learn" these associations based on previous order data.

To ensure that the staff at a store is aware of issues relating to a fixture, whenever an issue is reported on the system relating to a specific fixture, that fixture is designated as having an issue on a planogram or schematic of the store. This means that any planogram of the store would detail the fixture as having an issue by having the fixture be designated with a blinking icon or a differently colored icon on the store planogram. Essentially, any fixtures with issues are designated as being different on the store planogram by using an icon that is different (e.g. differently colored or is flashing) from the other fixture icons. For clarity, only users associated with a specific store can close tickets/remove the flashing icon in the planogram or remove the open ticket for a specific fixture in the store. This ensures that only users with direct knowledge of the fixture with the issue can detail that the issue has been dealt with. Similarly, a user with a higher access privilege (e.g. a superuser or an account manager) can remove/retire an open ticket for the fixture with the issue.

In one variant where an external entity is in charge of repairing/installing components for an organization operating one or more stores/retail outlets, the technician dispatched to attend to a work order is not able to close a ticket until the technician uploads an image of an authorization that the component/fixture has been repaired/installed. This can take the form of a form that has been signed by a store manager or a store employee that has witnessed the completion of the task in the work order (e.g., installation of a cabinet door). The technician can then take a digital image of the signed form as well as a digital image of the signature and must upload the image of the signed form as well as of the signature (and an identification of the signing person) to the system. Once one or more images have been uploaded and associated with a specific open ticket, only then can the ticket be closed. Or, alternatively, the ticket to be closed can then be forwarded, along with the documentation (e.g. the images of the signed and completed work order) to a user who is able to confirm/verify the documentation and the work. That user can then close the open ticket. It should be clear that, in lieu of a signed work order, the technician may upload an image of the completed task (e.g. an image of the installed cabinet door).

In terms of ordering replacement parts and/or replacement fixtures or for repair/replacement services, a user at a specific retail outlet can approve automated orders up to a certain dollar amount. For items/components that require a higher dollar amount, these may be forwarded to a person with a higher authority to approve. Once an order for a specific component/part has been forwarded to the person with a higher authority in the organization, these authorization messages are automatically tracked. If no action has been performed for an authorization order after, for example, two weeks, the higher authority person is sent a notification using one or more communications platform. As an example, a reminder email is sent as well as a reminder pop-up in the person's calendar. Similarly, a notification may also be sent by way of a text message (i.e. an SMS message) to that person's mobile phone. If the dollar amount is such that an escalated urgency is necessary, the system may automatically interface with the person's calendar along with the calendar of the person who made the authorization request. A slot open for both people is selected and a video/audio call is automatically scheduled between the two individuals so they can discuss the urgent requisition.

As an example, if user A at store A1 needs to order component/fixture B, then user A can use the system to view, select, and automatically order component/fixture B. If the component/fixture costs less than $1000, then the order is automatically approved and the ordering email is sent from the system to the supplier for component/fixture B. Concurrently, if the component/fixture B requires someone to install/fix the component/fixture B, then a work order for the installation/fixture of the component/fixture is generated by the system and sent, via email or some other electrical means, to either an internal department for physical plant requirements or to an external supplier that provides repair/installation/physical plant related services to the organization. Then the department or the external supplier can deal with the scheduling, dispatch, and repair/installation of the component/fixture. As noted above, the ordering/dispatch is automatically approved by the system as the dollar amount is at or below $1000.

However, if the component/fixture costs more than $1000, the order is first sent to a user C with higher authority in the organization for the store A1. An email or some other electronic communication means to user C is automatically generated asking for authorization to proceed with the purchase of component/fixture B. If user C approves the request and responds to the email with an authorization (such, for example, clicking an APPROVED button in the email), then authorization for the order is generated, with the authorization detailing the identity of user C, the identity of user A (who initiated the order), the date that user C approved the order, and with an identification of component/fixture B. The authorization then causes the generation of a suitable purchase order number from the organization's accounting system along with a suitable automated order form for the component/fixture B that includes the purchase order number. This automated order form is then dispatched/sent to a designated supplier for fulfillment. As well, if necessary, a work order for the installation/repair of the component/fixture is generated as above.

Because the dollar amount of the order requires authorization from a higher authority (i.e., user C), then the request for authorization is automatically tracked by the system. If the authorization request has not been approved or rejected after a set period of time (e.g. two weeks), then user C is reminded by way of one or more reminders through different communications channels. As noted above, this may be by way of an automated email, an automated text message on the user's mobile phone, an automated reminder entry on the user's calendar, or an automated message on user C's instant messaging app (e.g. WhatsApp, Microsoft Teams, Slack, etc.). If, after the initial reminder at 2 weeks, no action has been detected after 4 weeks, then another set of reminders can be automatically generated or the authorization request can be escalated to yet another user with a higher authority (e.g. user D who is user C's superior).

As a further variant, a third tier of urgency can be added. As noted above, if an order costs $1000 or less, then it can be automatically approved. If an order costs more than $1000, then an authorization request is automatically generated and forwarded to a user with higher authority than the user requesting the order. As noted above, if the authorization request has not been actioned/acted upon after a certain amount of time, the user with higher authority is reminded of the pending authorization request using one or more (preferably multiple) communications methods. These can be email, calendar reminders, instant messaging apps, mobile phone text messaging, and perhaps even a physical letter that is automatically generated and sent by regular post or maybe interoffice mail. If, however, the order costs more than $10,000, then a third tier of urgency may be needed. At that price point, the requested component/fixture may be mission critical and may require immediate authorization. For this third tier of urgency, once the authorization request is automatically generated, the system determines the dollar amount and, upon detecting that the authorization request is at the highest tier, the system automatically schedules a video/audio conference call between the user requesting the expensive item (i.e., user A) and the user with the higher authority (i.e., user C). The system checks the calendar of both individuals, determines a suitable time for a Zoom or Teams call (or some other audio/video conferencing technology), and automatically schedules such a Zoom/Teams call between the two. It should be noted that the call may even be a WhatsApp call if necessary and that, preferably, the call is scheduled as soon as possible. On the call, the user with the higher authority can then quiz the person asking for authorization about the request, the need for the item, options for cheaper alternatives, etc., etc.

It should be clear that the above tiers, while defined as being dependent on the cost of the order (i.e., $1000 and $10,000), may be defined using any other rubric. As well, while the tiers above are at $1,000 and at $10,000, other dollar values may be used and may be determined and configured according to the desired implementation.

Figure 10:
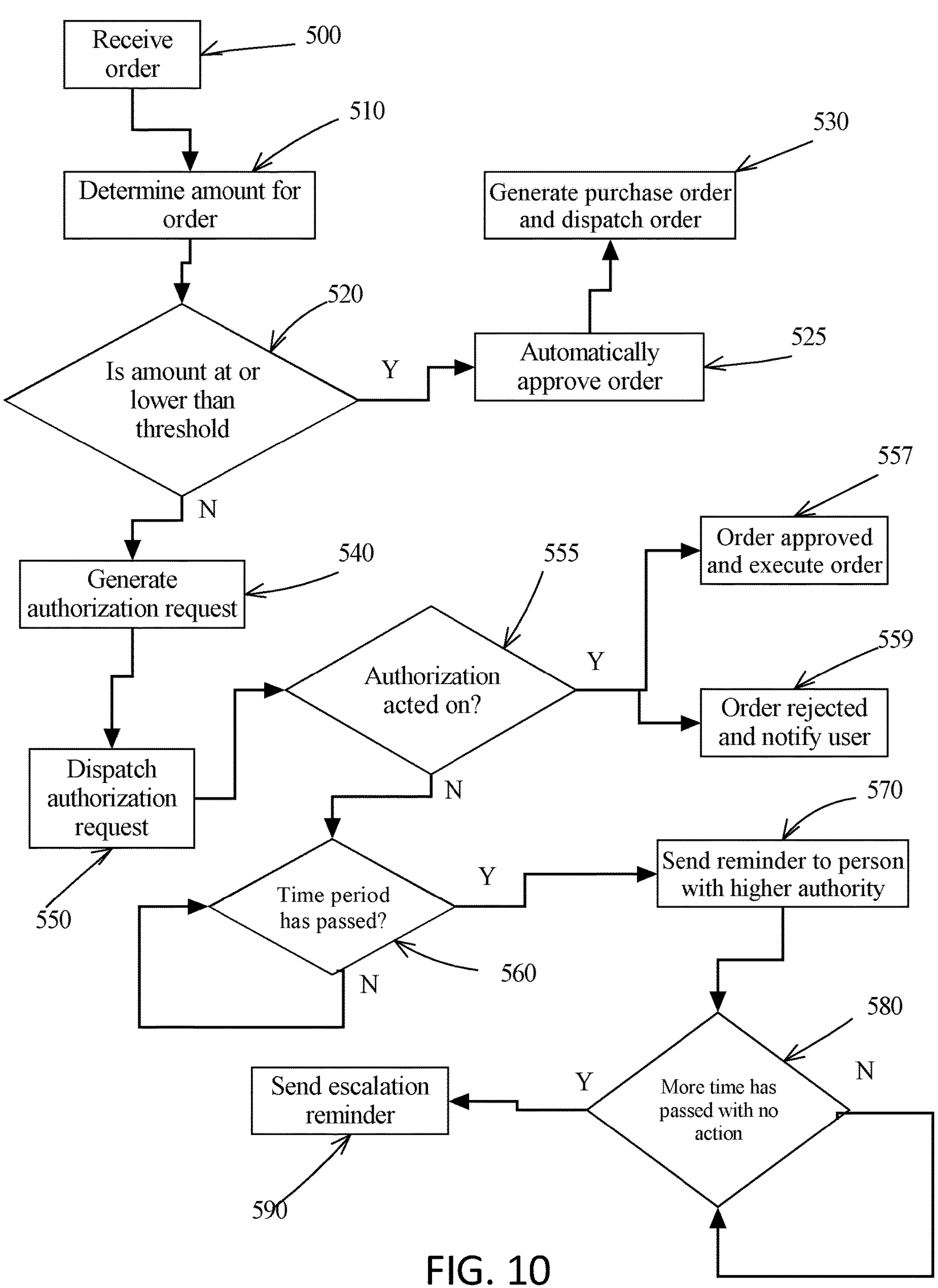
FIG. 10 is a flowchart detailing the steps in a method according to one aspect of the present invention.

Referring to FIG. 10, a flowchart detailing the steps in a method according to one aspect of the present invention is illustrated. As can be seen, the method begins at step 500, that of receiving an automatically generated order for a fixture or for a part of a fixture. As noted above, this automatically generated order is generated after a user selects a part of a fixture for replacement/repair. As noted above, if the order is at or below a specific threshold, the order can be automatically approved. Step 510 is that of determining the dollar amount of the order. Decision 520 then determines if the amount is at or below a specific threshold. If the amount is at or below the threshold, then the order is automatically approved (step 525) and a purchase order is generated and dispatched or the automated order is sent out (step 530). However, if decision 520 determines that the amount exceeds the specific threshold, then a request for authorization is automatically generated and dispatched to a person of higher authority than the person making the order (step 540 for automatically generating the authorization and step 550 for dispatching the authorization). Once dispatched (e.g., by email), the authorization is then automatically tracked. As the dispatched authorization is tracked, the system periodically checks if the person whose authorization is required has dealt with the requested authorization. The systems checks if the authorization request has been acted upon (decision 555). If the request has been acted upon, then either the request is approved and, hence the order is executed (step 557). Conversely, if the authorization is rejected, then the person requesting is notified (step 559). However, if a predetermined amount of time has passed without the authorization being either approved or denied, (decision 560), then the authorizing person is reminded of the pending authorization (step 570). This reminder may take multiple forms and may include sending a reminder or notification by multiple means including email, a text message (e.g., an SMS message to the person's mobile device), or some other means of notifying the person. A second check of the amount of time that has passed is conducted (decision 580) to determine if yet more time has passed since the reminder with no action being taken on the pending authorization request. As an example, the first check may be conducted to determine if 2 weeks has passed since the request was originally sent. The second check may be conducted at four weeks since the original request was sent. If no action has been taken after the second check, then an escalated reminder is sent (step 590). As an example, an entry may be made in the authorizing person's calendar about the pending authorization. As another possible reminder, the system may escalate the reminder by automatically scheduling an online meeting between the person who placed the order and the person who needs to authorize the order. The system automatically checks the online calendar of both persons, determines a date and time slot where both persons are free/unscheduled, and inserts a Teams/Zoom or other online meeting with each other.

Figure 11:
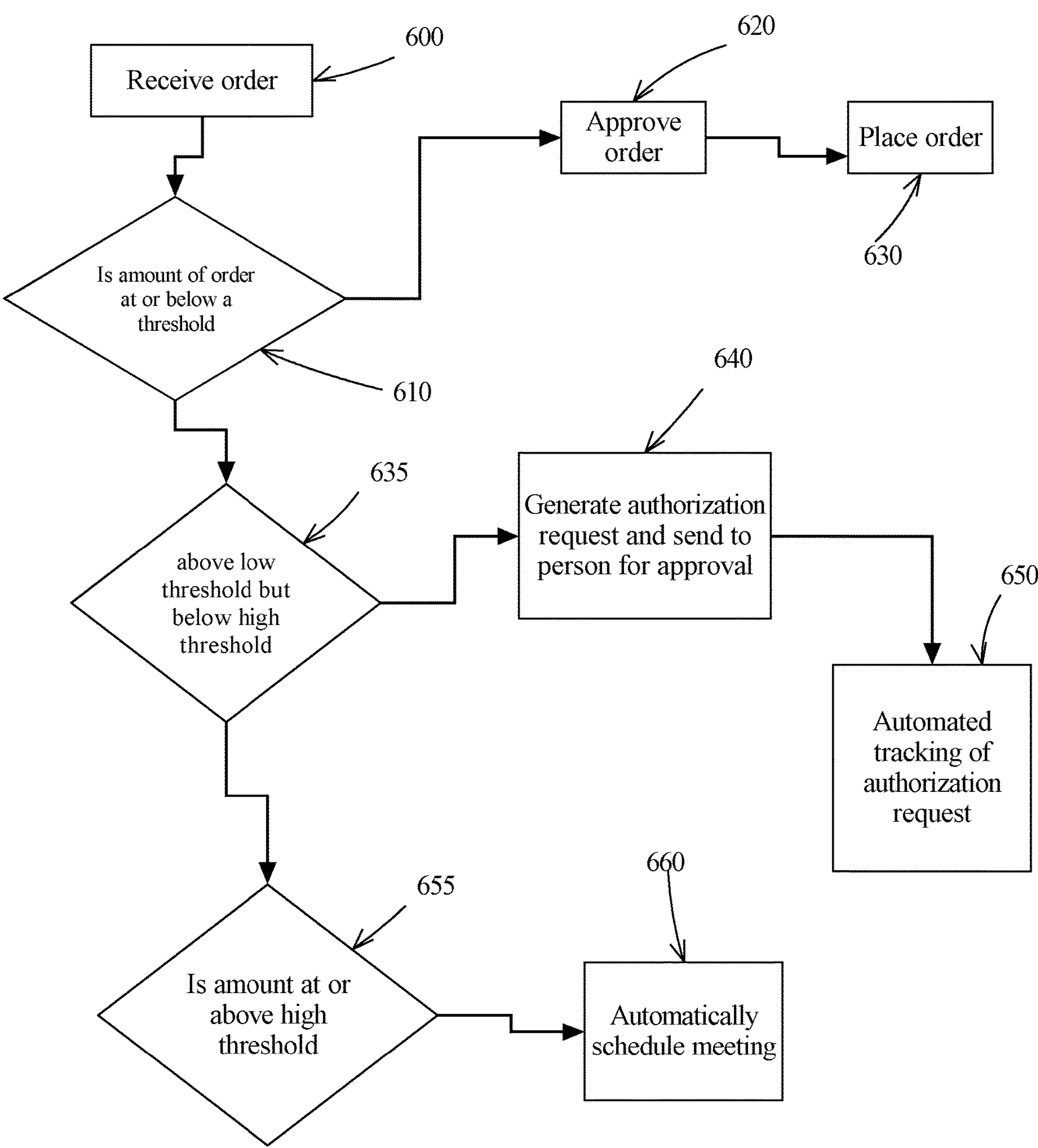
FIG. 11 is a flowchart detailing the steps in another method according to another aspect of the present invention.

Referring to FIG. 11, a flowchart for another method according to another aspect of the invention is illustrated. For this aspect of the invention, the system checks the amount of the request and, depending on the amount, the system can automatically approve the request, send an authorization request, or automatically schedule an online meeting between the person making the order and the person who can authorize the order. As can be seen in FIG. 11, the method begins with receiving the order (step 600). The system then determines if the amount is below a given threshold. If so (decision 610) then the order is approved (step 620) and the order is placed (step 630). However, if the order is in a middle ground, above the low threshold but lower than the high threshold (decision 635), then an authorization request is generated and sent to a higher authority person for approval (decision 640). The system then executes the automated tracking and checking as detailed in FIG. 10 (step 650). However, if the amount is at or above the highest threshold (decision 655), the system automatically schedules a meeting between the person placing the order and the person who has the authority to approve the order (step 660). As detailed above, this may involve automatically checking calendars, determining open time/date slots, and scheduling a meeting. This step ensures that the matter is dealt with and that neither party can avoid the decision/authorization.

It should be noted that while the above description mentions different functions being executed by different modules, some functions may be bundled into a single module. As such, some functions may be executed by modules other than as described above.

It should also be noted that the functionality of the system may be spread over a number of servers or over a number of computer systems. As such, the two databases noted above may be located in different servers or they may be resident on a single server. Similarly, the two databases may be implemented as a unitary database.

For clarity, the system can be used to generate planograms, provision display fixtures, and manage the deployment, placement, configuration, and maintenance of display fixtures.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Some features of embodiments of the invention may be implemented in any conventional computer programming language. For example, preferred embodiments may be implemented in a procedural programming language (e.g. "C") or an object-oriented language (e.g. "C++", "Java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for managing maintenance of at least one tangible display fixture in a physical store, the system comprising:
- a display fixture database, said display fixture database storing data relating to tangible parts of said at least one tangible display fixture;
- a server in communication with said database, said server configured for:
  - receiving input from a user, said input relating to a replacement tangible fixture part for said at least one tangible display fixture;
  - identifying at least one companion component for said replacement tangible fixture part, said at least one companion component being associated with said replacement tangible fixture part and said at least one companion component being identified using a first trained machine learning model;
  - when a price of said replacement tangible fixture part and said at least one companion component is higher than a predetermined value:
    - automatically generating an authorization request requesting authorization to order said replacement tangible fixture part and said at least one companion component, said authorization request requesting a user approval for an order for said replacement tangible fixture part and said at least one companion component;
    - automatically forwarding said authorization request to personnel having higher authority than said user;
    - associating a timer with said authorization request, said timer having a predetermined duration and beginning when said authorization request was generated;
    - detecting, when a duration of said timer expires, a status of said authorization request;
    - when said status is neither approved nor denied, automatically sending reminders regarding said authorization request to said personnel by way of at least one of:
    - an email message to said personnel;
    - a message to said personnel using a chat application;
    - a text message to said personnel using a mobile text messaging application; and
    - an entry in a calendar for said personnel;
  - when said price of said replacement tangible fixture part and said at least one companion component is under said predetermined value, automatically generating an automatic approval; and when said user approval or said automatic approval of said authorization request is received:

automatically generating a suitable purchase order for said replacement tangible fixture part and said at least one companion component; and automatically forwarding said purchase order to a supplier for said replacement tangible fixture part, and wherein said server is also in communication with at least one service scheduling database, wherein said server is configured for, when said replacement tangible fixture part meets at least one predetermined criterion:

accessing said service scheduling database to determine an available time for a service call for installation of said replacement tangible fixture part and said at least one companion component; and when said available time is found, automatically scheduling said service call, wherein said service call is scheduled using a second trained machine learning model.

2. The system according to claim 1, wherein said server is further configured for, upon generation of said purchase order, generating a work order from said purchase order, said work order incorporating said replacement tangible fixture part, and wherein said server is further configured for forwarding said work order to at least one entity for completion of said work order.

3. The system according to claim 2, wherein said server is further configured for generating a ticket, wherein said ticket is generated at the time of generating a related work order, wherein said server is further configured for tracking a completion date of said ticket, and, when said ticket remains open past a predetermined completion date, said server is further configured to cause said ticket to be displayed via a display to personnel having higher authority than said user.

4. The system according to claim 3, wherein closing said ticket requires uploading at least one image to said server, said at least one image detailing completion of said work order associated with said ticket.

5. The system according to claim 1, wherein said server causes an image of said replacement tangible fixture part to be displayed on a computer interface visible to said user.

6. The system according to claim 1, wherein said data regarding said tangible fixture parts includes contact details for at least one supplier of said tangible fixture parts.

7. The system according to claim 6, wherein said contact details for at least one supplier of said tangible fixture parts include at least one of: an email address, a telephone number, a website address.

8. The system according to claim 1, wherein said server is further configured to automatically order a quantity of said replacement tangible fixture part by automatically sending an email order to at least one supplier of said replacement tangible fixture part.

9. The system according to claim 8, wherein said server is further configured to automatically generate an order ticket at a time of sending said email order.

10. The system according to claim 8, wherein said server is further configured to escalate said order ticket in the event said order is not received within a predetermined amount of time.

11. The system according to claim 10, wherein, when said ticket is escalated, said server is further configured to send an automatic query to another contact at said at least one supplier of said replacement tangible fixture part.

12. The system according to claim 1, wherein, when said replacement tangible fixture part has a cost that is above a second predetermined value, said server is configured to automatically schedule a call between said personnel having higher authority and said user.

* * * * *